United States Patent [19]

Aida et al.

[11] Patent Number: 5,728,641
[45] Date of Patent: Mar. 17, 1998

[54] CATALYST COMPONENT FOR THE POLYMERIZATION OF OLEFINS

[75] Inventors: Fuyuki Aida, Tokyo; Yoshio Tajima; Kazuo Matsuura, both of Yokohama, all of Japan

[73] Assignee: Nippon Oil Company, Limited, Tokyo, Japan

[21] Appl. No.: 464,655

[22] PCT Filed: Oct. 27, 1994

[86] PCT No.: PCT/JP94/01813

§ 371 Date: Jun. 21, 1995

§ 102(e) Date: Jun. 21, 1995

[87] PCT Pub. No.: WO95/11928

PCT Pub. Date: May 4, 1995

[30] Foreign Application Priority Data

Oct. 27, 1993 [JP] Japan ................. 5-302148
Jun. 14, 1994 [JP] Japan ................. 6-164448

[51] Int. Cl.$^6$ .................................. C08F 4/649
[52] U.S. Cl. .................. 502/114; 502/115; 502/125; 502/126; 502/129; 502/119; 502/128; 526/119; 526/128; 526/143; 526/943; 526/144; 526/132
[58] Field of Search .................. 526/144, 143, 526/128, 119, 943; 502/119, 125, 126, 128, 114, 115

[56] References Cited

U.S. PATENT DOCUMENTS

| | | | |
|---|---|---|---|
| 2,898,329 | 8/1959 | Kittleson | 526/86 |
| 2,944,048 | 7/1960 | Nowlin et al. | 526/144 |
| 3,242,099 | 3/1966 | Manyik et al. | 502/117 |
| 3,432,513 | 3/1969 | Miller et al. | 526/144 |
| 3,481,911 | 12/1969 | Kahle et al. | 526/144 |
| 3,781,220 | 12/1973 | Shilou et al. | 502/119 |
| 4,321,346 | 3/1982 | Ueno et al. | 526/142 |
| 4,657,998 | 4/1987 | Malpass | 526/144 |
| 5,331,071 | 7/1994 | Kataoka et al. | 526/128 |
| 5,395,810 | 3/1995 | Shamshoum et al. | 502/113 |
| 5,397,757 | 3/1995 | Mink et al. | 502/115 |
| 5,451,555 | 9/1995 | Tajima et al. | 502/103 |
| 5,504,232 | 4/1996 | Winter et al. | 556/7 |
| 5,539,076 | 7/1996 | Nowlin et al. | 526/348.1 |
| 5,556,821 | 9/1996 | Aida et al. | 502/113 |

Primary Examiner—Mark Nagumo
Attorney, Agent, or Firm—Dilworth & Barrese

[57] ABSTRACT

According to the present invention there are provided a catalyst component, a catalyst using the catalyst component and a process using the catalyst, for the preparation of olefin polymers high in molecular weight and relatively wide in molecular weight distribution, using an extremely small amount of a modified organoaluminum compound such as methylaluminoxane and in high yield. The catalyst component is prepared by contacting at least the following constituents (1), (2), (3) and (4) with one another:

(1) a compound represented by the general formula $Me^1R^1_p(OR^2)_qX_{4-p-q}$ where $R^1$ and $R^2$ are each independently a hydrocarbon group having 1 to 24 carbon atoms, X is a halogen atom, Me is Zr, Ti or Hf, p and q are each an integer in the ranges of $0 \leq p \leq 4$ and $0 \leq q \leq 4$, provided $0 \leq p+q \leq 4$;

(2) at least one compound selected from the group consisting of compounds represented by the following general formulas 1 to 4:

General formula 1: $Me^2R^3_m(OR^4)_nX^2_{z-m-n}$
General formul 2: $Me^3H_2R^5_{3-a}$
General formula 3: $Me^4[Me^3H_bR^6_c(OR^7)_{4-b-c}]_y$
General formula 4:

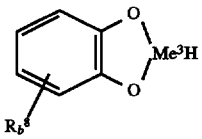

where $R^3, R^4, R^5, R^6, R^7$ and $R^8$, which may be the same or different, are each independently a hydrocarbon group having 1 to 24 carbon atoms, $Me^2$ is a Group 1, 2, 12 or 13 element in the Periodic Table of Elements, $Me^3$ is a Group 13 element in the same Table, $Me^4$ is a Group 1, 2, or 12 element in the same Table, $X^2$ is a halogen atom, z is the valence of $Me^2$, y is the valence of $Me^4$, and m, n, a, b, c and d are each an integer in the ranges of $0 \leq m \leq z$, $0 \leq n \leq z$, provided $0 \leq m+m \leq z$, $0 < a \leq 3$, $1 \leq b \leq 4$, $1 \leq c \leq 3$, provided $1 \leq b+c \leq 4$; and $0 \leq d \leq 4$;

(3) an organocyclic compound having two or more conjugated double bonds; and (4) a compound containing a carbon-halogen bond.

1 Claim, No Drawings

CATALYST COMPONENT FOR THE POLYMERIZATION OF OLEFINS

[FIELD OF INVENTION]

The present invention relates to a catalyst component for use in the polymerization or copolymerization of olefins. This catalyst component is high in catalytic efficiency, contains only a small amount of a modified organoaluminum compound, affords a polymer having a high molecular weight and a relatively wide molecular weight distribution, or a copolymer having a narrow composition distribution, and permits easy control of the molecular weight and molecular weight distribution. The present invention is further concerned with a catalyst using the said catalyst component and an olefin polymer preparing process using such catalyst. The olefin polymer as referred to herein is a generic term for both homopolymer and copolymer of olefins.

[PRIOR ART]

As means for obtaining an ethylenic polymer or ethylene/α-olefin copolymer having a narrow molecular weight distribution and a narrow composition distribution there recently has been proposed the use of a catalyst comprising a zirconium compound and an aluminoxane (JP58-19309A).

According to a process using such proposed catalyst there is obtained an ethylene copolymer in high yield which copolymer is narrow in both molecular weight distribution and composition distribution. However, the molecular weight of the copolymer is low and the amount of the aluminoxane used is large.

JP63-234005A proposes the use of a transition metal compound having a 2, 3 and 4-substituted cyclopentadienyl group to improve the molecular weight of the resulting polymer. In JP2-22307A it is proposed to use a hafnium compound having a ligand bonded to at least two crosslinked conjugated cycloalkadienyl groups for improving the molecular weight of the resulting polymer.

However, the use of hafnium as a transition metal is disadvantageous in that the yield of the resulting polymer is low.

[OBJECT OF THE INVENTION]

It is the object of the present invention to provide a catalyst component and a catalyst using the same which catalyst component and catalyst can afford an olefin polymer having a high molecular weight and a relatively wide molecular weight distribution in high yield and in an extremely small amount of a modified organoaluminum compound used, as well as a polymer preparing process using the said catalyst.

Having made earnest studies in view of the above-mentioned object, the present inventors found out a novel catalyst capable of achieving the object and an olefin polymer preparing process using such catalyst.

[SUMMARY OF THE INVENTION]

The present invention relates to a catalyst component for the polymerization of olefins which catalyst component is prepared by contacting at least the following constituents (1), (2), (3) and (4) with one another:

(1) a compound represented by the general formula $Me^1R^1_p(OR^2)_qX_{4-p-q}$ wherein $R^1$ and $R^2$ are each independently a hydrocarbon group having 1 to 24 carbon atoms, X is a halogen atom, Me is Zr, Ti or Hf, p and q are each an integer in the ranges of $0 \leq p \leq 4$ and $0 \leq q \leq 4$, provided $0 \leq p+q \leq 4$;

(2) at least one compound selected from the group consisting of compounds represented by the following general formulas 1 to 4:
General formula 1: $Me^2R^3_m(OR^4)_nX^2_{z-m-n}$
General formula 2: $Me^3H_aR^5_{3-a}$
General formula 3: $Me^4[Me^3H_bR^6_c(OR^7)_{4-b-c}]_y$
General formula 4:

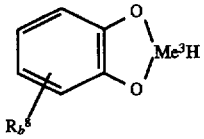

where $R^3, R^4, R^5, R^6, R^7$ and $R^8$, which may be the same or different, are each independently a hydrocarbon group having 1 to 24 carbon atoms, $Me^2$ is a Group 1, 2, 12 or 13 element in the Periodic Table of Elements, $Me^3$ is a Group 13 element in the same Table, $Me^4$ is a Group 1, 2, or 12 element in the same Table, $X^2$ is a halogen atom, z is the valence of $Me^2$, y is the valence of $Me^4$, and m, n, a, b, c and d are each an integer in the ranges of $0 \leq m \leq z$, $0 \leq n \leq z$, provided $0 \leq m+n \leq z$, $0 < a \leq 3$, $1 \leq b \leq 4$, $1 \leq c \leq 3$, provided $1 \leq b+c \leq 4$; and $0 \leq d \leq 4$;

(3) an organocyclic compound having two or more conjugated double bonds; and (4) a compound containing a carbon-halogen bond.

The present invention also relates to a catalyst for the polymerization of olefins, comprising the above catalyst component and a modified organoaluminum compound containing Al-O-Al bond prepared by the reaction of an organoaluminum compound and water.

The present invention further relates to a process for preparing an olefin polymer or copolymer, characterized by polymerizing or copolymerizing olefins in the presence of the above catalyst.

The olefin polymerizing catalyst according to the present invention is high in catalytic efficiency, permits the use of a modified organoaluminum compound such as aluminoxane in a reduced amount and can afford a polymer of a high molecular weight and a relatively wide molecular weight distribution and a copolymer having a narrow composition distribution.

When the polymer prepared using the olefin polymerizing catalyst according to the present invention is subjected to molding, the resulting molded product is free of stickiness irrespective of whether the molding method is brown film method or T-die method, thus permitting high-speed molding. There is attained an extremely good moldability. Besides, films formed by using such polymer, no matter how the molding method may be blown film method or T-die method, are superior in all of transparency, anti-blocking property and strength.

[PREFERRED EMBODIMENTS OF THE INVENTION]

The present invention will be described in detail hereinunder.

Reference will first be made to constituent (1), namely, a compound of the general formula $Me^1R^1_p(OR^2)_qX^1_{4-p-q}$. $R^1$ and $R^2$ in this formula are each independently a hydrocarbon group having 1 to 14, preferably 1 to 12, more preferably 1 to 8, carbon atoms. As examples of such hydrocarbon group are mentioned alkyl groups such as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl and octyl, alkenyl groups such as vinyl and allyl, aryl groups such as phenyl, tolyl, xylyl, mesityl, indenyl and naphthyl, and aralkyl groups such as benzyl, trityl, phenetyl, styryl, benzhydryl, phenylbutyl, phenylpropyl and neophyl. These groups may have branches. Further, in the above formula, $X^1$ is a halogen atom selected from fluorine, iodine, chlorine and bromine, $Me^1$ is Zr, Ti or Hf, preferably Zr, and p and q are in the ranges of $0 \leq p \leq 4$ and $0 \leq q \leq 4$, provided $0 \leq p+q \leq 4$, preferably $0 < p+q \leq 4$.

Suitable examples of constituent (1) include tetramethylzirconium, tetraethylzirconium, tetrapropylzirconium, tetra-n-butylzirconium, tetrapentylzirconium, tetraphenylzirconium, tetratolyzirconium, tetrabenzylzirconium, tetraallylzirconium, tetraneophylzirconium, tetramethoxyzirconium, tetraethoxyzirconium, tetrapropoxyzirconium, tetrabutoxyzirconium, tetrapentyloxyzirconium, tetraphenoxyzirconium, tetratolyloxyzirconium, tetrabenzyloxyzirconium, tetraallyloxyzirconium, tetraneophyloxyzirconium, trimethylmonochlorozirconium, triethylmonochlorozirconium, tripropylmonochlorozirconium, tri-n-butylmonochlorozirconium, tripentylmonochlorozirconium, triphenylmonochlorozirconium, tritolylmonochlorozirconium, tribenzylmonochlorozirconium, triallylmonochlorozirconium, trineophylmonochlorozirconium, dimethyldichlorozirconium, diethyldichlorozirconium, dipropyldichlorozirconium, di-n-butyldichlorozirconium, dipentyldichlorozirconium, diphenyldichlorozirconium, ditolyldichlorozirconium, dibenzyldichlorozirconium, diallyldichlorozirconium, dineophyldichlorozirconium, monomethyltrichlorozirconium, monoethyltrichlorozirconium, monopropyltrichlorozirconium, mono-n-butyltrichlorozirconium, monopentyltrichlorozirconium, monophenyltrichlorozirconium, monotolyltrichlorozirconium, monobenzyltrichlorozirconium, monoallyltrichlorozirconium, mononeophyltrichlorozirconium, tetrachlorozirconium, trimethoxymonochlorozirconium, dimethoxydichlorozirconium, monomethoxytrichlorozirconium, triethoxymonochlorozirconium, diethoxydichlorozirconium, monoethoxytrichlorozirconium, tripropoxymonochlorozirconium, dipropoxydichlorozirconium, monopropoxytrichlorozirconium, tri-n-butoxymonochlorozirconium, di-n-butoxydichlorozirconium, mono-n-butoxytrichlorozirconium, tripentyloxymonochlorozirconium, dipentyloxydichlorozirconium, monopentyloxytrichlorozirconium, triphenoxymonochlorozirconium, diphenoxydichlorozirconium, monophenoxytrichlorozirconium, tritolyloxymonochlorozirconium, ditolyloxydichlorozirconium, monotolyloxytrichlorozirconium, tribenzyloxymonochlorozirconium, dibenzyloxydichlorozirconium, monobenzyloxytrichlorozirconium, triallyloxymonochlorozirconium, diallyloxydichlorozirconium, monoallyloxytrichlorozirconium, trineophyloxymonochlorozirconium, dineophyloxydichlorozirconium, mononeophyloxytrichlorozirconium, tetrabromozirconium, trimethylmonobromozirconium, triethylmonobromozirconium, tripropylmonobromozirconium, tri-n-butylmonobromozirconium, tripentylmonobromozirconium, triphenylmonobromozirconium, tritolylmonobromozirconium, tribenzylmonobromozirconium, triallylmonobromozirconium, trineophylmonobromozirconium, dimethyldibromozirconium, diethyldibromozirconium, dipropyldibromozirconium, di-n-butyldibromozirconium, dipentyldibromozirconium, diphenyldibromozirconium, ditolyldibromozirconium, dibenzyldibromozirconium, diallyldibromozirconium, dineophyldibromozirconium, monomethyltribromozirconium, monoethyltribromozirconium, monopropyltribromozirconium, mono-n-butyltribromozirconium, monopentyltribromozirconium, monophenyltribromozirconium, monotolyltribromozirconium, monobenzyltribromozirconium, monoallyltribromozirconium, mononeophyltribromozirconium, trimethoxymonobromozirconium, dimethoxydibromozirconium, monomethoxytribromozirconium, triethoxymonobromozirconium, diethoxydibromozirconium, monoethoxytribromozirconium, tripropoxymonobromozirconium, dipropoxydibromozirconium, monopropoxytribromozirconium, tri-n-butoxymonobromozirconium, di-n-butoxydibromozirconium, mono-n-butoxytribromozirconium, tripentyloxymonobromozirconium, dipentyloxydibromozirconium, monopentyloxytribromozirconium, triphenoxymonobromozirconium, diphenoxydibromozirconium, monophenoxytribromozirconium, tritolyloxymonobromozirconium, ditolyloxydibromozirconium, monotolyloxytribromozirconium, tribenzyloxymonobromozirconium, dibenzyloxydibromozirconium, monobenzyloxytribromozirconium, triallyloxymonobromozirconium, diallyloxydibromozirconium, monoallyloxytribromozirconium, trineophyloxymonobromozirconium, dineophyloxydibromozirconium, mononeophyloxytribromozirconium, tetraiodozirconium, trimethylmonoiodozirconium, triethylmonoiodozirconium, tripropylmonoiodozirconium, tri-n-butylmonoiodozirconium, tripentylmonoiodozirconium, triphenylmonoiodozirconium, tritolylmonoiodozirconium, tribenzylmonoiodozirconium, triallylmonoiodozirconium, trineophylmonoiodozirconium, dimethyldiiodozirconium, diethyldiiodozirconium, dipropyldiiodozirconium, di-n-butyldiiodozirconium, dipentyldiiodozirconium, diphenyldiiodozirconium, ditolyldiiodozirconium, dibenzyldiiodozirconium, diallyldiiodozirconium, dineophyldiiodozirconium, monomethyltriiodozirconium, monoethyltriiodozirconium, monopropyltriiodozirconium, mono-n-butyltriiodozirconium, monopentyltriiodozirconium, monophenyltriiodozirconium, monotolyltriiodozirconium, monobenzyltriiodozirconium, trimethoxymonoiodozirconium, dimethoxydiiodozirconium, monomethoxytriiodozirconium, triethoxymonoiodozirconium, diethoxydiiodozirconium, monoethoxytriiodozirconium, tripropoxymonoiodozirconium, dipropoxydiiodozirconium, monopropoxytriiodozirconium, tri-n-butoxymonoiodozirconium, di-n-butoxydiiodozirconium, mono-n-butoxytriiodozirconium, tripentyloxymonoiodozirconium, dipentyloxydiiodozirconium, monopentyloxytriiodozirconium, triphenoxymonoiodozirconium, diphenoxydiiodozirconium, monophenoxytriiodozirconium, tritolyloxymonoiodozirconium, ditolyloxydiiodozirconium, monotolyloxytriiodozirconium, tribenzyloxymonoiodozirconium, dibenzyloxydiiodozirconium, monobenzyloxytriiodozirconium, triallyloxymonoiodozirconium, diallyloxydiiodozirconium, monoallyloxytriiodozirconium, trineophyloxymonoiodozirconium, dineophyloxydiiodozirconium, mononeophyloxytriiodozirconium, tribenzylmonomethoxyzirconium, tribenzylmonoethoxyzirconium, tribenzylmonopropoxyzirconium, tribenzylmonobutoxyzirconium, tribenzylmonopentyloxyzirconium, tribenzylmonophenoxyzirconium, tribenzylmonotolyloxyzirconium, tribenzylmonobenzyloxyzirconium, tribenzylmonoallyloxyzirconium, tribenzylmononeophyloxyzirconium, dibenzyldimethoxyzirconium, dibenzyldiethoxyzirconium, dibenzyldipropoxyzirconium, dibenzyldibutoxyzirconium, dibenzyldipentyloxyzirconium, dibenzyldiphenoxyzirconium, dibenzylditolyloxyzirconium, dibenzyldibenzyloxyzirconium, dibenzyldiallyloxyzirconium, dibenzyldineophyloxyzirconium, monobenzyltrimethoxyzirconium, monobenzyltriethoxyzirconium, monobenzyltripropoxyzirconium, monobenzylmonobutoxyzirconium, monobenzyltripentyloxyzirconium, monobenzyltriphenoxyzirconium, monobenzyltritolyloxyzirconium, monobenzyltribenzyloxyzirconium, monobenzyltriallyloxyzirconium, monobenzyltrineophyloxyzirconium, trineophylmonomethoxyzirconium, trineophylmonoethoxyzirconium, trineophylmonopropoxyzirconium, trineophylmonobutoxyzirconium, trineophylmonophenoxyzirconium, dineophyldimethoxyzirconium, dineophyldiethoxyzirconium, dineophyldipropoxyzirconium, dineophyldibutoxyzirconium, dineophyldiphenoxyzirconium, mononeophyltrimethoxyzirconium, mononeophyltriethoxyzirconium, mononeophyltripropoxyzirconium, mononeophyltributoxyzirconium, mononeophyltriphenoxyzirconium, tetramethyltitanium, tetraethyltitanium, tetrapropyltitanium, tetra-n-butyltitanium, tetrapentyltitanium, tetraphenyltitanium, tetratolyltitanium, tetrabenzyltitanium, tetraallyltitanium, tetraneophyltitanium, tetramethoxytitanium, tetraethoxytitanium, tetrapropoxytitanium, tetrabutoxytitanium, tetrapentyloxytitanium, tetraphenoxytitanium, tetratolyloxytitanium, tetrabenzyloxytitanium, tetraallyloxytitanium, tetraneophyloxytitanium, trimethylmonochlorotitanium, triethylmonochlorotitanium, tripropylmonochlorotitanium, tri-n-butylmonochlorotitanium, tribenzylmonochlorotitanium, dimethyldichlorotitanium, diethyldichlorotitanium, di-n-butyldichlorotitanium, dibenzyldichlorotitanium, monomethyltrichlorotitanium, monoethyltrichlorotitanium, mono-n-butyltrichlorotitanium, monobenzyltrichlorotitanium, tetrachlorotitanium, trimethoxymonochlorotitanium, dimethoxydichlorotitanium, monomethoxytrichlorotitanium, triethoxymonochlorotitanium, diethoxydichlorotitanium, monoethoxytrichlorotitanium, tripropoxymonochlorotitanium, dipropoxydichlorotitanium, monopropoxytrichlorotitanium, tri-n-butoxymonochlorotitanium, di-n-butoxydichlorotitanium, mono-n-butoxytrichlorotitanium, tripentyloxymonochlorotitanium, dipentyloxydichlorotitanium, monopentyloxytrichlorotitanium, triphenoxymonochlorotitanium, diphenoxydichlorotitanium, monophenoxytrichlorotitanium, tritolyloxymonochlorotitanium, ditolyloxydichlorotitanium, monotolyloxytrichlorotitanium, tribenzyloxymonochlorotitanium, dibenzyloxydichlorotitanium, monobenzyloxytrichlorotitanium, tetrabromotitanium, trimethylmonobromotitanium, triethylmonobromotitanium, tripropylmonobromotitanium, tri-n-butylmonobromotitanium, tribenzylmonobromotitanium, dimethyldibromotitanium, diethyldibromotitanium, di-n-butyldibromotitanium, dibenzyldibromotitanium, monomethyltribromotitanium, monoethyltribromotitanium, mono-n-butyltribromotitanium, monobenzyltribromotitanium, trimethoxymonobromotitanium, dimethoxydibromotitanium, monomethoxytribromotitanium, triethoxymonobromotitanium, diethoxydibromotitanium, monoethoxytribromotitanium, tripropoxymonobromotitanium, dipropoxydibromotitanium, monopropoxytribromotitanium, tri-n-butoxymonobromotitanium, di-n-butoxydibromotitanium, mono-n-butoxytribromotitanium, tripentyloxymonobromotitanium, dipentyloxydibromotitanium, monopentyloxytribromotitanium, triphenoxymonobromotitanium, diphenoxydibromotitanium, monophenoxytribromotitanium, tritolyloxymonobromotitanium, ditolyloxydibromotitanium, monotolyloxytribromotitanium, tribenzyloxymonobromotitanium, dibenzyloxydibromotitanium, monobenzyloxytribromotitanium, tetraiodotitanium, trimethylmonoiodotitanium, triethylmonoiodotitanium, tripropylmonoiodotitanium, tri-n-butylmonoiodotitanium, tribenzylmonoiodotitanium, dimethyldiiodotitanium, diethyldiiodotitanium, di-n-butyldiiodotitanium, dibenzyldiiodotitanium, monomethyltriiodotitanium, monoethyltriiodotitanium, mono-n-butyltriiodotitanium, monobenzyltriiodotitanium, trimethoxymonoiodotitanium, dimethoxydiiodotitanium, monomethoxytriiodotitanium, triethoxymonoiodotitanium, diethoxydiiodotitanium, monoethoxytriiodotitanium, tripropoxymonoiodotitanium, dipropoxydiiodotitanium, monopropoxytriiodotitanium, tri-n-butoxymonoiodotitanium, di-n-butoxydiiodotitanium, mono-n-butoxytriiodotitanium, tripentyloxymonoiodotitanium, dipentyloxydiiodotitanium, monopentyloxytriiodotitanium, triphenoxymonoiodotitanium, diphenoxydiiodotitanium, monophenoxytriiodotitanium, tritolyloxymonoiodotitanium, ditolyloxydiiodotitanium, monotolyloxytriiodotitanium, tribenzyloxymonoiodotitanium, dibenzyloxydiiodotitanium, monobenzyloxytriiodotitanium, tribenzylmonomethoxytitanium, tribenzylmonoethoxytitanium, tribenzylmonopropoxytitanium, tribenzylmonobutoxytitanium, tribenzylmonophenoxytitanium, dibenzyldimethoxytitanium, dibenzyldiethoxytitanium, dibenzyldipropoxytitanium, dibenzyldibutoxytitanium, dibenzyldiphenoxytitanium, monobenzyltrimethoxytitanium, monobenzyltriethoxytitanium, monobenzyltripropoxytitanium, monobenzylmonobutoxytitanium, monobenzyltriphenoxytitanium, trineophylmonomethoxytitanium, trineophylmonoethoxytitanium, trineophylmonopogpoxytitanium, trineophylmonobutoxytitanium, trineophylmonophenoxytitanium, dineophyldimethoxytitanium, dineophyldiethoxytitanium, dineophyldipropoxytitanium, dineophyldibutoxytitanium, dineophyldiphenoxytitanium, mononeophyltrimethoxytitanium, mononeophyltriethoxytitanium, mononeophyltripropoxytitanium, mononeophyltributoxytitanium, mononeophyltriphenoxytitanium, tetramethylhafnium, tetraethylhafnium, tetrapropylhafnium, tetra-n-butylhafnium, tetrapentylhafnium, tetraphenylhafnium, tetratolylhafnium, tetrabenzylhafnium, tetraallylhafnium, tetraneophylhafnium, tetramethoxyhafnium, tetraethoxyhafnium, tetrapropoxyhafnium, tetrabutoxyhafnium, tetrapentyloxyhafnium, tetraphenoxyhafnium, tetratolyloxyhafnium, tetrabenzyloxyhafnium, tetraallyloxyhafnium, tetraneophyloxyhafnium, trimethylmonochlorohafnium, triethylmonochlorohafnium, tripropylmonochlorohafnium, tri-n-butylmonochlorohafnium, tribenzylmonochlorohafnium, dimethyldichlorohafnium, diethyldichlorohafnium, di-n-butyldichlorohafnium, dibenzyldichlorohafnium, monomethyltrichlorohafnium, monoethyltrichlorohafnium, mono-n-butyltrichlorohafnium, monobenzyltrichlorohafnium, tetrachlorohafnium, trimethoxymonochlorohafnium, dimethoxydichlorohafnium, monomethoxytrichlorohafnium, triethoxymonochlorohafnium, diethoxydichlorohafnium, monoethoxytrichlorohafnium, tripropoxymonochlorohafnium, dipropoxydichlorohafnium, monopropoxytrichlorohafnium, tri-n-butoxymonochlorohafnium, di-n-butoxydichlorohafnium, mono-n-butoxytrichlorohafnium, tripentyloxymonochlorohafnium, dipentyloxydichlorohafnium, monopentyloxytrichlorohafnium, triphenoxymonochlorohafnium, diphenoxydichlorohafnium, monophenoxytrichlorohafnium, tritolyloxymonochlorohafnium, ditolyloxydichlorohafnium, monotolyloxytrichlorohafnium, tribenzyloxymonochlorohafnium, dibenzyloxydichlorohafnium, monobenzyloxytrichlorohafnium, tetrabromohafnium, trimethylmonobromohafnium, triethylmonobromohafnium, tripropylmonobromohafnium, tri-n-butylmonobromohafnium, tribenzylmonobromohafnium, dimethyldibromohafnium, diethyldibromohafnium, di-n-butyldibromohafnium, dibenzyldibromohafnium, monomethyltribromohafnium, monoethyltribromohafnium, mono-n-butyltribromohafnium, monobenzyltribromohafnium, trimethoxymonobromohafnium, dimethoxydibromohafnium, monomethoxytribromohafnium, triethoxymonobromohafnium, diethoxydibromohafnium, monoethoxytribromohafnium, tripropoxymonobromohafnium, dipropoxydibromohafnium, monopropoxytribromohafnium, tri-n-butoxymonobromohafnium, di-n-butoxydibromohafnium, mono-n-butoxytribromohafnium, tripentyloxymonobromohafnium, dipentyloxydibromohafnium, monopentyloxytribromohafnium, triphenoxymonobromohafnium, diphenoxydibromohafnium, monophenoxytribromohafnium, tritolyloxymonobromohafnium, ditolyloxydibromohafnium, monotolyloxytribromohafnium, tribenzyloxymonobromohafnium, dibenzyloxydibromohafnium, monobenzyloxytribromohafnium, tetraiodohafnium, trimethylmonoiodohafnium, triethylmonoiodohafnium, tripropylmonoiodohafnium, tri-n-butylmonoiodohafnium, tribenzylmonoiodohafnium, dimethyldiiodohafnium, diethyldiiodohafnium, di-n-butyldiiodohafnium, dibenzyldiiodohafnium, monomethyltriiodohafnium, monoethyltriiodohafnium, mono-n-butyltriiodohafnium, monobenzyltriiodohafnium, trimethoxymonoiodohafnium, dimethoxydiiodohafnium, monomethoxytriiodohafnium, triethoxymonoiodohafnium, diethoxydiiodohafnium, monoethoxytriiodohafnium, tripropoxymonoiodohafnium, dipropoxydiiodohafnium, monopropoxytriiodohafnium, tri-n-butoxymonoiodohafnium, di-n-butoxydiiodohafnium, mono-n-butoxytriiodohafnium, tripentyloxymonoiodohafnium, dipentyloxydiiodohafnium, monopentyloxytriiodohafnium, triphenoxymonoiodohafnium, diphenoxydiiodohafnium, monophenoxytriiodohafnium, tritolyloxymonoiodohafnium, ditolyloxydiiodohafnium, monotolyloxytriiodohafnium, tribenzyloxymonoiodohafnium, dibenzyloxydiiodohafnium, monobenzyloxytriiodohafnium, tribenzylmonomethoxyhafnium, tribenzylmonoethoxyhafnium, tribenzylmonopropoxyhafnium, tribenzylmonobutoxyhafnium, tribenzylmonophenoxyhafnium, dibenzyldimethoxyhafnium, dibenzyldiethoxyhafnium, dibenzyldipropoxyhafnium, dibenzyldibutoxyhafnium, dibenzyldiphenoxyhafnium, monobenzyltrimethoxyhafnium, monobenzyltriethoxyhafnium, monobenzyltripropoxyhafnium, .monobenzylmonobutoxyhafnium, monobenzyltriphenoxyhafnium, trineophylmonomethoxyhafnium, trineophylmonoethoxyhafnium, trineophylmonopropoxyhafnium, trineophylmonobutoxyhafnium, trineophylmonophenoxyhafnium, dineophyldimethoxyhafnium, dineophyldiethoxyhafnium, dineophyldipropoxyhafnium, dineophyldibutoxyhafnium, dineophyldiphenoxyhafnium, mononeophyltrimethoxyhafnium, mononeophyltriethoxyhafnium, mononeophyltripropoxyhafnium, mononeophyltributoxyhafnium, and mononeophyltriphenoxyhafnium.

It goes without saying that in the compunds referred to above as examples of constituent (1) there is included not only the case where $R^1$ and $R^2$ in the general formula concerned are n- groups but also the case where they are isomeric groups of various structures such as iso-, s-, t- and neo-.

Among the compounds exemplified above, tetramethylzirconium, tetraethylzirconium, tetrabenzylzirconium, tetrapropoxyzirconium, tripropoxymonochlorozirconium, tetrabutoxyzirconium, tetrabutoxytitanium, tetrabutoxyhafnium are preferred. Particularly preferred are the compounds represented by the formula $Zr(OR)_4$, including tetrapropoxyzirconium and tetrabutoxyzirconium. These compounds may be used as a mixture of two or more.

The following description is now provided about constituent (2). The constituent (2) used in the present invention is at least one compound selected from the group consisting of the compounds represented by the following general formulas 1 to 4:

General formula 1: $Me^2R^3_m(OR_4)_n X^2_{z-m-n}$
General formula 2: $Me^3H_aR^5_{3-a}$
General formula 3: $Me^4[Me^3H_bR^6_c(OR^7)_{4-b-c}]_y$
General formula 4:

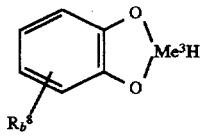

In the above formulas, $Me^2$ is a Group 1, 2, 12 or 13 element (a Group I to III element) in the Periodic Table.

Examples are such alkali metals as lithium, sodium and potassium, such alkaline earth metals as magnesium, calcium and barium, as well as zinc, boron and aluminum. $Me^3$ is a Group 13 element in the Periodic Table, examples of which are boron and aluminum. $Me^4$ is a Group 1, 2, or 12 element in the same Table, examples of which are such alkali metals as lithium, sodium and potassium, such alkaline earth metals as magnesium, calcium and barium, as well as zinc.

$R^3$, $R^4$, $R^5$, $R^6$, $R^7$ and $R^8$, which may be the same or different, are each a hydrocarbon group having 1 to 24, preferably 1 to 12, more preferably 1 to 8, carbon atoms. Also when two or more Rs are present in one molecule, the Rs may be the same or different. Examples are alkyl groups such as methyl, ethyl, propyl, isopropyl, cyclopropyl, butyl, isobutyl, t-butyl, pentyl, isopentyl, neopentyl, cyclopentyl, hexyl, isohexyl, cyclohexyl, heptyl, octyl, decyl and dodecyl, alkenyl groups such as vinyl and allyl, aryl groups such as phenyl, tolyl, xylyl, mesityl, indenyl and naphthyl, and aralkyl groups such as benzyl, trityl, phenetyl, styryl, benzhydryl, phenylbutyl, phenylpropyl and neophyl. These hydrocarbon groups may have branches, and in the case where two or more Rs are present in one molecule, the Rs may be the same or different.

$X^2$ is a halogen atom such as fluorine, iodine, chlorine or bromine; z is the valence of $Me^2$; y is the valence of $Me^4$; and m, n, a, b and c are preferably integers, though not always required to be integers, in the ranges of $0 \leq m \leq z$, $0 \leq n \leq z$, provided $0 \leq m+n \leq z$, preferably $0 < m+n \leq z$, $0 \leq a \leq 3$, $1 \leq b \leq 4$, $1 \leq c \leq 3$, provided $1 \leq b+c \leq 4$, $0 \leq d \leq 4$, preferably $0 \leq d \leq 2$, more preferably $0 \leq d \leq 1$, most preferably d=0. In the general formula 3, when $Me^3$ is boron, $Me^4$ is preferably sodium, lithium or zinc, and when $Me^3$ is aluminum, $Me^4$ is preferably sodium, lithium or potassium. In the general formula 4, the substituent position of $R^8$ is not specially limited. For example, with d=2, its substituent position is the 4, 5-position, 4,6-position, or 5- or 6-position, and with d=1, it is the 4- or 5-position.

Of course, the compounds of the foregoing general formulas 1 to 4 may be used as a mixture of two to four, and how to combine them is not specially limited. As examples of combinations are mentioned general formulas 1 and 2, 1 and 3, 1 and 4, 2 and 3, 2 and 4, 3 and 4, and 1, 2 and 3.

Suitable examples of constituent (2) include methyllithium, ethyllithium, propyllithium, isopropyllithium, butyllithium, t-butyllithium, pentyllithium, octyllithium, phenyllithium, benzyllithium, dimethylmagnesium, diethylmagnesium, di-n-propylmagnesium, diisopropylmagnesium, dibutylmagnesium, di-t-butylmagnesium, dipentylmagnesium, dioctylmagnesium, diphenylmagnesium, dibenzylmagnesium, methylmagnesium chloride, ethylmagnesium chloride, propylmagnesium chloride, isopropylmagnesium chloride, butylmagnesium chloride, t-butylmagnesium chloride, pentylmagnesium chloride, octylmagnesium chloride, phenylmagnesium chloride, benzylmagnesium chloride, methylmagnesium bromide, methylmagnesium iodide, ethylmagnesium bromide, ethylmagnesium iodide, propylmagnesium bromide, propylmagnesium iodide, isopropylmagnesium bromide, isopropylmagnesium iodide, butylmagnesium bromide, butylmagnesium iodide, t-butylmagnesium bromide, t-butylmagnesium iodide, pentylmagnesium bromide, pentylmagnesium iodide, octylmagnesium bromide, octylmagnesium iodide, phenylmagnesium bromide, phenylmagnesium iodide, benzylmagnesium bromide, benzylmagnesium iodide, dimethylzinc, diethylzinc, dipropylzinc, diisopropylzinc, di-n-butylzinc, di-t-butylzinc, dipentylzinc, dioctylzinc, diphenylzinc, dibenzylzinc, trimethylboron, triethylboron, tripropylboron, triisopropylboron, tributylboron, tri-t-butylboron, tripentylboron, trioctylboron, triphenylboron, tribenzylboron, trimethylaluminum, triethylaluminum, diethylaluminum chloride, diethylaluminum bromide, diethylaluminum fluoride, diethylaluminum iodide, ethylaluminum dichloride, ethylaluminum dibromide, ethylaluminum difluoride, ethylaluminum diiodide, tripropylaluminum, dipropylaluminum chloride, dipropylaluminum bromide, dipropylaluminum fluoride, dipropylaluminum iodide, propylaluminum dichloride, propylaluminum dibromide, propylaluminum difluoride, propylaluminum diiodide, triisopropylaluminum, diisopropylaluminum chloride, diisopropylaluminum bromide, diisopropylaluminum fluoride, diisopropylaluminum iodide, ethylaluminum sesquichloride, ethylaluminum sesquibromide, propylaluminum sesquichloride, propylaluminum sesquibromide, butylaluminum sesquichloride, butylaluminum sesquibromide, isopropylaluminum dichloride, isopropylaluminum dibromide, isopropylaluminum difluoride, isopropylaluminum diiodide, tributylaluminum, dibutylaluminum chloride, dibutylaluminum bromide, dibutylaluminum fluoride, dibutylaluminum iodide, butylaluminum dichloride, butylaluminum dibromide, butylaluminum difluoride, butylaluminum diiodide, tri-sec-butylaluminum, di-sec-butylaluminum chloride, di-sec-butylaluminum bromide, di-sec-butylaluminum fluoride, di-sec-butylaluminum iodide, sec-butylaluminum dichloride, sec-butylaluminum dibromide, sec-butylaluminum difluoride, sec-butylaluminum diiodide, tri-tert-butylaluminum, di-tert-butylaluminum chloride, di-tert-butylaluminum bromide, di-tert-butylaluminum fluoride, di-tert-butylaluminum iodide, tert-butylaluminum dichloride, tert-butylaluminum dibromide, tert-butylaluminum difluoride, tert-butylaluminum diiodide, triisobutylaluminum, diisobutylaluminum chloride, diisobutylaluminum bromide, diisobutylaluminum fluoride, diisobutylaluminum iodide, isobutylaluminum dichloride, isobutylaluminum dibromide, isobutylaluminum difluoride, isobutylaluminum diiodide, trihexylaluminum, dihexylaluminum chloride, dihexylaluminum bromide, dihexylaluminum fluoride, dihexylaluminum iodide, hexylaluminum dichloride, hexylaluminum dibromide, hexylaluminum difluoride, hexylaluminum diiodide, tripentylaluminum, dipentylaluminum chloride, dipentylaluminum bromide, dipentylaluminum fluoride, dipentylaluminum iodide, pentylaluminum dichloride, pentylaluminum dibromide, pentylaluminum difluoride, pentylaluminum diiodide, methylaluminum methoxide, methylaluminum ethoxide, methylaluminum propoxide, methylaluminum butoxide, dimethylaluminum methoxide, dimethylaluminum ethoxide, dimethylaluminum propoxide, dimethylaluminum butoxide, ethylaluminum methoxide, ethylaluminum ethoxide, ethylaluminum propoxide, ethylaluminum butoxide, diethylaluminum methoxide, diethylaluminum ethoxide, diethylaluminum propoxide, diethylaluminum butoxide, propylaluminum methoxide, propylaluminum ethoxide, propylaluminum propoxide, propylaluminum butoxide, dipropylaluminum methoxide, dipropylaluminum ethoxide, dipropylaluminum propoxide, dipropylaluminum butoxide, butylaluminum methoxide, butylaluminum ethoxide, butylaluminum propoxide, butylaluminum butoxide, dibutylaluminum methoxide, dibutylaluminum ethoxide, dibutylaluminum propoxide, dibutylaluminum butoxide, aluminum hydride, dimethylaluminum hydride, diethylaluminum hydride, dipropylaluminum hydride, di-iso-propylaluminum hydride, dibutylaluminum hydride, di-iso-butylaluminum hydride, hexylaluminum hydride, dihexylaluminum hydride, dicyclohexylaluminum hydride, lithium aluminum hydride, sodium aluminum hydride, lithium aluminum trimethoxy hydride, sodium aluminum trimethoxy hydride, lithium aluminum triethoxy hydride, sodium aluminum triethoxy hydride, lithium aluminum tri-tert-butoxy hydride, sodium aluminum tri-tert-butoxy hydride, borane, diborane, 2,3-dimethyl-2-butylborane, bis(3-methyl-2-butyl)borane, dicyclohexylborane, diisopinocamphenylborane, 9-borabicyclo[3,3,1]nonane, catecholborane, lithium borohydride, sodium borohydride, zinc borohydride, magnesium borohydride, calcium borohydride, barium borohydride, lithium triethyl borohydride, lithium tri-iso-butyl borohydride, potassium tri-iso-butyl borohydride, sodium cyano borohydride, potassium cyano borohydride, catecholborane(1,3,2-benzodioxaboral), 4-methyl-1,3,2-benzodioxaboral, 5-methyl-1,3,2-benzodioxaboral, dimethyl-1,3,2-benzodioxaboral, 4,6-dimethyl-1,3,2-benzodioxaboral, 4,7-dimethyl-1,3,2-benzodioxaboral, 4-ethyl-1,3,2-benzodioxaboral, 5-ethyl-1,3,2-benzodioxaboral, 4,5-diethyl-1,3,2-benzodioxaboral, 4,6-diethyl-1,3,2-benzodioxaboral, 4,7-diethyl-1,3,2-benzodioxaboral, 4-propyl-1,3,2-benzodioxaboral, 5-propyl-1,3,2-benzodioxaboral, 4,5-dipropyl-1,3,2-benzodioxaboral, 4,6-dipropyl-1,3,2-benzodioxaboral, 4,7-dipropyl-1,3,2-benzodioxaboral, 4,5,6-trimethyl-1,3,2-benzodioxaboral, 4,5,7-trimethyl-1,3,2-benzodioxaboral, 4,5,6,7-tetramethyl-1,3,2-benzodioxaboral.

Particularly preferred are trimethylaluminum, triethylaluminum, tripropylaluminum, triisopropylaluminum, tributylaluminum, triisobutylaluminum, trihexylaluminum, aluminum hydride, dimethylaluminum hydride, diethylaluminum hydride, di-iso-butyl aluminum hydride, lithium aluminum hydride, lithium aluminum trimethoxy hydride, sodium borohydride, lithium tri-iso-butyl borohydride and potassium tri-iso-butyl borohydride.

These compounds may be used in combination. Preferred combinations are di-iso-butylaluminum hydride and sodium borohydride, di-iso-butylaluminum hydride and lithium aluminum hydride, lithium aluminum triethoxyhydride and sodium borohydride, and lithium aluminum triethoxyhydride and lithium aluminum hydride.

As constituent (3) there is used an organocyclic compound having two or more conjugated double bonds. As examples of constituent (3) are included cyclic hydrocarbons having two or more, preferably 2 to 4, more preferably 2 to 3, conjugated double bonds, and having a total number of carbon atoms of 4 to 24, preferably 4 to 12, preferably cyclic hydrocarbons having one or more rings and a total number of carbon atoms of 4 to 24, preferably 4 to 12, the said rings each having two or more, preferably 2 to 4, more preferably 2 to 3, conjugated double bonds; cyclic hydrocarbons resulting from partial substitution of the above cyclic hydrocarbons with one to six hydrocarbon groups (typically an alkyl or aralkyl group of 1 to 12 carbon atoms); organosilicon compounds contaning cyclic hydrocarbon group having two or more, preferably 2 to 4, more preferably 2 to 3, conjugated double bonds, and a total number of carbon atoms of 4 to 24, preferably 4 to 12, preferably a cyclic hydrocarbon group having one or more rings and a total number of carbon atoms of 4 to 24, preferably 4 to 12, the said rings each having two or more, preferably 2 to 4, more preferably 2 to 3, conjugated double bonds; organosilicon compounds resulting from partial substitution of the above cyclic hydrocarbon groups with one to six hydrocarbon residues; and alkali metal salts (e.g. sodium salts and lithium salts) of these compounds. Particularly preferred are those containing a cyclopentadiene structure in their molecules.

Compounds represented by the following general formula are mentioned as suitable examples of the above cyclic hydrocarbons:

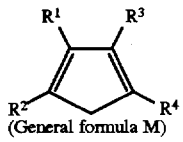
(General formula M)

where $R^1$, $R^2$, $R^3$ and $R^4$ are each independently hydrogen or a hydrocarbon residue (preferably of 1 to 10 carbon atoms), provided any two of $R^1$, $R^2$, $R^3$ and $R^4$ may conjointly from a cyclic hydrocarbon group. As examples of the hydrocarbon residue are mentioned such alkyl groups as methyl, ethyl, propyl, isopropyl, butyl, t-butyl, hexyl and octyl, such an aryl groups as phenyl, such alkoxy groups as methoxy, ethoxy and propoxy, such an aryloxy group as phenoxy, such an aralkyl group as benzyl, and are further mentioned cycloheptatriene, aryl, and condensed rings thereof, as examples of the skeleton of a cyclic hydrocarbon group in the case of any two conjointly forming the said cyclic hydrocarbon group. More concrete and suitable exampls of compounds represented by the above formula are cyclopentadiene, indene, azUlene, as well as alkyl-, aryl-, aralkyl-, alkoxy- or aryloxy- substituted derivatives thereof. Compounds with the compounds of the above general formula bonded (crosslinked) through an alkylene group (having usually 2 to 8, preferably 2 to 3, carbon atoms) are also suitable.

The organosilicon compounds having a cyclic hydrocarbon group can be represented by the following general formula:

where A represents the foregoing cyclic hydrocarbon group exemplified by cyclopentadienyl, substituted cyclopentadienyl, indenyl and substituted indenyl, R is a hydrocarbon residue having 1 to 24, preferably 1 to 12, carbon atoms examples of which are such alkyl groups as methyl, ethyl, propyl, isopropyl, butyl, t-butyl, hexyl and octyl, such alkoxy groups as methoxy, ethoxy, propoxy and butoxy, such an aryl group as phenyl, such an aryloxy group as phenoxy, and such an aralkyl group as benzyl, or hydrogen, and L is $1 \leq L \leq 4$, preferaby $1 \leq L \leq 3$.

Concrete exampls of organocyclic hydrocarbons employable as constituent (3) include cyclopolyenes or substituted cyclopolyenes having 7 to 24 carbon atoms such as cyclopentadiene, methylcyclopentadiene, ethylcyclopentadiene, t-butylcyclopentadiene, hexylcyclopentadiene, octylcyclopentadiene, 1,2-dimethylcyclopentadiene, 1,3-dimethylcyclopentadiene, 1,2,4-trimethylcyclopentadiene, 1,2,3,4-tetramethylcyclopentadiene, pentamethylcyclopentadiene, indene, 4-methyl-1-indene, 4,7-dimethylindene, 4,5,6,7-tetrahydroindene, cycloheptatriene, methylcycloheptatriene, cyclooctatetraene, methylcyclooctatetraene, azulene, methylazulene, ethylazulene, fluorene, and methylfluorene, as well as monocyclopentadienylsilane, biscyclopentadienylsilane, triscyclopentadienylsilane, tetrakiscyclopentadienylsilane, monocyclopentadienylmonomethylsilane, monocyclopentadienylmonoethylsilane, monocyclopentadienyldimethylsilane, monocyclopentadienyldiethylsilane, monocyclopentadienyltrimethylsilane, monocyclopentadienyltriethylsilane, monocyclopentadienylmonomethoxysilane, monocyclopentadienylmonoethoxysilane, monocyclopentadienylmonophenoxysilane, biscyclopentadienylmonomethylsilane, biscyclopentadienylmonoethylsilane, biscyclopentadienyldimethylsilane, biscyclopentadienyldiethylsilane, biscyclopentadienylmethylethylsilane, biscyclopentadienyldipropylsilane, biscyclopentadienylethylpropylsilane, biscyclopentadienyldiphenylsilane, biscyclopentadienylpheneylmethylsilane, biscyclopentadienylmonomethoxysilane, biscyclopentadienylmonoethoxysilane, triscyclopentadienylmonomethylsilane, triscyclopentadienylmonoethylsilane, triscyclopentadienylmonomethoxysilane, triscyclopentadienylmonoethoxysilane, 3-methylcyclopentadienylsilane, 1,2-dimethylcyclopentadienylsilane, 1,3-dimethylcyclopentadienylsilane, 1,2,4-trimethylcyclopentadienylsilane, 1,2,3,4-tetramethylcyclopentadienylsilane, pentamethylcyclopentadienylsilane, monoindenylsilane, bisindenylsilane, trisindenylsilane, tetrakisindenylsilane, monoindenylmonomethylsilane, monoindenylmonoethylsilane, monoindenyldimethylsilane, monoindenyldiethylsilane, monoindenyltrimethylsilane, monoindenyltriethylsilane, monoindenylmonomethoxysilane, monoindenylmonoethoxysilane, monoindenylmonophenoxysilane, bisindenylmonomethylsilane, bisindenylmonoethylsilane, bisindenyldimethylsilane, bisindenyldiethylsilane, bisindenylmethylethylsilane, bisindenyldipropylsilane, bisindenylethylpropylsilane, bisindenyldiphenylsilane, bisindenylpheneylmethylsilane, bisindenylmonomethoxysilane, bisindenylmonoethoxysilane, trisindenylmonomethylsilane, trisindenylmonoethylsilane, trisindenylmonomethoxysilane, trisindenylmonoethoxysilane, 3-methylindenylsilane, bis-3-methylindenylsilane, 3-methylindenymethylsilane, 1,2-dimethylindenylsilane, 1,3-dimethylindenylsilane, 1,2,4-trimethylindenylsilane, 1,2,3,4-tetramethylindenylsilane and pentamethylindenylsilane.

Compounds with any of the above compounds bonded through an alkylene group (usually 2 to 8, preferably 2 to 3, carbon atoms) are also employable as constituent (3) in the present invention. Examples of such compounds include bisindenylethane, bis(4,5,6,7-tetrahydro-1-indenyl)ethane, 1,3-propanedinylbisindene, 1,3-propanedinylbis(4,5,6,7-tetrahydro)indene, propylenebis(1-indene), isopropyl(1-indenyl)cyclopentadiene, diphenylmethylene(9-fluorenyl)cyclopentadiene, isopropylcyclopentadienyl-1-fluoreneisopropylbiscyclopentadiene. Of course, two or more of these compounds may be combined for use.

The carbon-halogen bond-containing compound [constituent (4)] as a further essential constituent of the olefin polymerizing catalyst of the present invention is a compound containing a carbon-halogen bond in the molecule thereof. More particularly, it is a compound obtained by substituting one or two or all of hydrogens contained in a hydrocarbon group-containing organic compound with a halogen atom. To be concrete, it is a carbon-halogen bond-containing compound represented by the general formula $R^2$-$R^3{}_q$ or $R^2(A$-$R^3)_q$ where q is a number falling under the range of $1 \leq q \leq 4$ or $1 \leq q \leq 3$, A is a group selected from —O—, —OSiR$^4{}_2$—, —C(OR$^5$)$_2$— and —C(OR$^5$)$_2$O—, $R^2$ is a halocarbon group having 1 to 30 carbon atoms, $R^3$ and $R^4$ are each a hydrogen atom, a halogen atom, or a hydrocarbon residue having 1 to 30 carbon atoms, and $R^5$ is a hydrocarbon residue having 1 to 30 carbon atoms, provided in the case where $R^3$, $R^4$ or $R^5$ is included in a plural number, the plural Rs may be the same or different, and $R^2$ and $R^3$ may conjointly form a ring.

The halocarbon group as $R^2$ indicates a hydrocarbon group wherein one methylene group in the molecular chain may be substituted with an oxygen atom and wherein the hydrogen atoms in the molecule thereof have been substituted partially or wholly with one or more halogen atoms such as fluorine, chlorine, bromine and iodine, particularly one or more fluorine atoms. As examples of the hydrocarbon group are mentioned monovalent hydrocarbon groups usually having 1 to 30, preferably 1 to 20, more preferably 1 to 12, carbon atoms as well we polyvalent hydrocarbon groups having 2 to 4 free valences. More concrete examples are monovalent hydrocarbon groups typified by such alkyl groups as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl, oxtyl, decyl, and dodecyl, such alkenyl groups as vinyl and allyl, such aryl groups as phenyl, tolyl, xylyl, mesityl, indenyl, and naphthyl, and such an aralkyl group as benzyl, trityl, phenethyl, styryl, benzhydryl, phenylbutyl, phenylpropyl and neophyl; divalent hydrocarbon groups typified by such alkylene groups as methylene, ethylene, propylene and butylene, arylene, and arylalkylene; trivalent hydrocarbon groups typified by alknetriyl, arenetriyl, and arylalkanetriyl; and tetravalent hydrocarbon groups typified by alkanetetrayl, arenetetrayl, and arylalkanetetrayl. Of course these hydrocarbon groups may have branches. As to the number of substituent halogen atom in the above halocarbon group, there is no special limitation. One or more or all of hydrogen atoms may be substituted with halogen atoms. No limitation is placed, either, on the substituent position and configuration, which may be selected arbitrarilyl.

As examples of halogen atoms, substituents $R^3$, R4 and $R^5$ are mentioned fluorine, chlorine, bromine and iodine. The hydrocarbon residue indicates a hydrocarbon group or a hydrocarbon group with one or more hydrogen atoms substituted with arbitrary functional groups. As examples of such functional groups are mentioned groups represented by the general formula —OR$^{11}$ where $R^{11}$ is the foregoing $C_1$ to $C_{20}$ hydrocarbon group or halocarbon group, as well as halogen atoms such as fluorine, chlorine, bromine and iodine. As the hydrocarbon group serving as the basic skeleton of the hydrocarbon residue as referred to herein there is mentioned a hydrocarbon group usually having 1 to 30, preferably 1 to 20, more preferably 1 to 12, carbon atoms.

As examples of such hydrocarbon group are mentioned such alkyl groups as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl, octyl, decyl, and dodecyl, such alkenyl groups as vinyl and allyl, such aryl groups as phenyl, tolyl, xylyl, mesityl, indenyl, and naphthyl, such aralkyl groups as benzyl, trityl, phenethyl, styryl, benzhydryl, phenylbutyl, phenylpropyl and neophyl, such alkylene groups as methylene, ethylene, propylene, isopropylene, cyclopropylene, butylene, isobutylene, tert-butylene, cyclobutylene, pentylene, isopentylene, neopentylene, cyclopentylene, hexylene, isohexylene, cyclohexylene, heptylene, and octylene, such arylene groups as phenylene, mesitylene, tolylene, xylylene, indenylene, and naphthylene, and such aralkylene groups as benzylene, tritylene, phenethylene and styrylene.

As more concrete examples of the carbon-halogen bond-containing compound [constituent (4)] are mentioned compounds represented by the following general formulas:

 (general formula A)

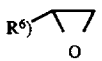 (general formula B)

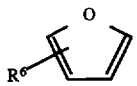 (general formula C)

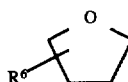 (general formula D)

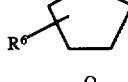 (general formula E)

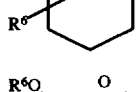 (general formula F)

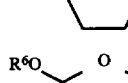 (general formula G)

$R^6$—O—$R^8$ (general formula H)
$R^6$—O—SiR$^8$ (general formula I)
$R^6R^9$C(OR$^8$)$_2$ (general formula J)
$R^8R^9$C(OR$^6$)(OR$^8$) (general formula K)
$R^6$C(OR$^8$)$_3$ (general formula L)
$R^8$C(OR$^6$)(OR$^8$)$_2$ (general formula M)
$R^6$—$R^{10}$ (general formula N)

In the above formulas, $R^6$ is a halocarbon group having 1 to 30, preferably 1 to 20, more preferably 1 to 12, carbon atoms. The "halocarbon group" as referred to herein indicates a hydrocarbon group wherein the hydrogen atoms in the molecule thereof have been substituted partially or wholly with halogen atoms such as fluorine, chlorine, bromine or iodine atoms, preferably fluorine atoms. In this case, examples of hydrocarbon groups include such alkyl groups as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl, octyl, decyl, and dodecyl, such alkenyl groups as vinyl and allyl, such aryl groups as phenyl, tolyl, xylyl, mesityl, indenyl, and naphthyi, and such aralkyl groups as benzyl, trityl, phenethyl, styryl, benzhydryl, phenylbutyl, phenylpropyl and neophyl. Of course these hydrocarbon groups may have branches. In the above halocarbon group, the number of the substituents halogen atom is not specially limited. Also as to the substitution position and configuration there is no special limitation. They may be selected arbitrary.

Examples of the halocarbon group as $R^6$ include fluoromethyl, fluoroethyl, fluoropropyl, fluoroisopropyl, fluorocyclopropyl, fluorobutyl, fluoroisobutyl, fluoro-tert-butyl, fluorocyclobutyl, fluoropentyl, fluoroisopentyl, fluoroneopentyl, fluorocyclopentyl, fluorohexyl, fluoroisohexyl, fluorocyclohexyl, fluoroheptyl, fluorooctyl, fluorophenyl, fluorobenzyl, fluoromesityl, fluoroindenyl, fluoronaphthyl, trifluoroethyl, hexafluoroisopropyl, pentafluoropropyl, perfluorobutylethyl, perfluoroethyl, perfluorodecylethyl, perfluoroethylhexyl, perfluorobutylhexyl, perfluorohexylhexyl, perfluorooctylhexyl, perfluoroisoamylethyl, perfluoroisonoylethyl, perfluoroisopropylhexyl, perfluoroisoamylhexyl, perfluoroisoheptylhexyl, perfluoroisononylhexyl, tetrafluoropropyl, octafluoropentyl, dodecafluoroheptyl, hexadecafluorononyl, bis(trifluoromethyl)propyl, hexafluorobutyl, perfluorohexyliodopropyl, perfluorooctyliodopropyl, perfluoisoheptyliodopropyl, perfluoisononyliodopropyl, octafluoropropyl, perfluorobutyl, octafluorocyclobutyl, perfluoropentyl, perfluorocyclopentyl, perfluorohexyl, perfluorocyclohexyl, perfluoroheptyl, perfluorocycloheptyl, perfluorooctyl, perfluorocyclooctyl, perfluorononyl, perfluorocyclononyl, perfluorodecyl, perfluorocyclodecyl, perfluoroundecyl, perfluorocycloundecyl, perfluorododecyl, perfluorocyclododecyl, perfluorotridecyl, perfluorocyclotridecyl, perfluorotetradecyl, perfluorocyclotetradecyl, perfluoropentadecyl, perfluorocyclopentadecyl, perfluorohexadecyl, perfluorocyclohexadecyl, perfluoroheptadecyl, perfluorocycloheptadecyl, perfluorooctadecyl, perfluorocyclooctadecyl, perfluorononadecyl, perfluorocyclononadecyl, perfluorononaeicosyl, perfluorocycloeicosyl, perfluorophenyl, perfluorobenzyl, perfluoroxylyl, perfluoromesitylenyl, perfluorocumyl, perfluoronaphthatyl, perfluorodecalyl, fluorodicyclomethyl, 1,1-dicyclo-1-fluoroethyl, 1-bromo-2-fluoroethyl, 1,1-difluoroethyl, bromotetrafluoropropyl, iodooctafluorobutyl, pentafluorophenyl, bromotetrafluorophenyl, chlorotetrafluorophenyl, iodotetrafluorophenyl, tetrafluorophenyl, chlorotrifluorophenyl, dichlorotrifluorophenyl, bromotrifluorophenyl, dibromotrifluorophenyl, trifluorophenyl, chlorodifluorophenyl, dichlorodifluorophenyl, trichlorofluorophenyl, dibromodifluorophenyl, dibromodifluorophenyl, tribromodifluorophenyl, difluorophenyl, chlorofluorophenyl, dichlorofluorophenyl, trichlorofluorophenyl, tetrachlorofluorophenyl, bromofluorophenyl, dibromofluorophenyl, tribromofluorophenyl, tetrabromofluorophenyl, trifluorophenyl, hexafluoroxylyl, trifluoromethylnaphthyl, di-(trifluoromethyl)-naphthyl, trifluoromethyldecalyl, di-(trifluoromethyl)-decalin, chloromethyl, chloroethyl, chloropropyl, chloroisopropyl, chlorocyclopropyl, chlorobutyl, chloroisobutyl, chloro-tert-butyl, chlorocyclobutyl, chloropentyl, chloroisopentyl, chloroneopentyl, chlorocyclopentyl, chlorohexyl, chloroisohexyl, chlorocyclohexyl, chloroheptyl, chlorooctyl, chlorophenyl, chlorobenzyl, chloromesityl, chloroindenyl, chloronaphthyl, trichloroethyl, hexachloroisopropyl, pentachloropropyl, perchlorobutylethyl, perchloroethyl, perchlorodecylethyl, perchloroethylhexyl, perchlorobutylhexyl, perchlorohexylhexyl, perchlorooctylhexyl, perchloroisoamylethyl, perchloroisonoylethyl, perchloroisopropylhexyl, perchloroisoamylhexyl, perchloroisoheptylhexyl, perchloroisononylhexyl, tetrachloropropyl, octachloropentyl, dodecachloroheptyl, hexadecachlorononyl, bis(trichloromethyl)propyl, hexachlorobutyl, octachloropropyl, perchlorobutyl, octachlorocyclobutyl, perchloropentyl, perchlorocyclopentyl, perchlorohexyl, perchlorocyclohexyl, perchloroheptyl, perchlorocycloheptyl, perchlorooctyl, perchlorocyclooctyl, perchlorononyl, perchlorocyclononyl, perchlorodecyl, perchlorocyclodecyl, perchloroundecyl, perchlorocycloundecyl, perchlorododecyl, perchlorocyclododecyl, perchlorotridecyl, perchlorocyclotridecyl, perchlorotetradecyl, perchlorocyclotetradecyl, perchloropentadecyl, perchlorocyclopentadecyl, perchlorohexadecyl, perchlorocyclohexadecyl, perchloroheptadecyl, perchlorocycloheptadecyl, perchlorooctadecyl, perchlorocyclooctadecyl, perchlorononadecyl, perchlorocyelononadecyl, perchlorononaeicosyl, perchlorocycloeicosyl, perchlorophenyl, perchlorobenzyl, perchloroxylyl, perchloromesitylenyl, perchlorocumyl, perchloronaphthatyl, perchlorodecalyl, 1,1-dichloroethyl, pentachlorophenyl, tetrachlorophenyl, trichlorophenyl, dichlorophenyl, hexachloroxylyl, trichloromethylnaphthyl, di-(trichloromethyl)-decalyl, bromomethyl, bromoethyl, bromopropyl, bromoisopropyl, bromocyclopropyl, bromobutyl, bromoisobutyl, bromo-tert-butyl, bromocyclobutyl, bromopentyl, bromoisopentyl, bromoneopentyl, bromocyclopentyl, bromohexyl, bromoisohexyl, bromocyclohexyl, bromoheptyl, bromooctyl, bromophenyl, bromobenzyl, bromomesityl, bromoindenyl, bromonaphthyl, tribromoethyl, hexabromoisopropyl, pentabromopropyl, perbromobutylethyl, perbromoethyl, perbromodecylethyl, perbromoethylhexyl, perbromobutylhexyl, perbromohexylhexyl, perbromooctylhexyl, perbromoisoamylethyl, perbromoisonoylethyl, perbromoisopropylhexyl, perbromoisoamylhexyl, perbromoisoheptylhexyl, perbromoisononylhexyl, tetrabromopropyl, octabromopentyl, dodecabromoheptyl, hexadecabromononyl, bis(tribromomethyl)propyl, hexabromobutyl, octabromopropyl, perbromobutyl, octabromocyclobutyl, perbromopentyl, perbromocyclopentyl, perbromohexyl, perbromocyclohexyl, perbromoheptyl, perbromocycloheptyl, perbromooctyl, perbromocyclooctyl, perbromononyl, perbromocyclononyl, perbromodecyl, perbromocyclodecyl, perbromoundecyl, perbromocycloundecyl, perbromododecyl, perbromocyclododecyl, perbromotridecyl, perbromocyclotridecyl, perbromotetradecyl, perbromocyclotetradecyl, perbromopentadecyl, perbromocyclopentadecyl, perbromohexadecyl, perbromocyclohexadecyl, perbromoheptadecyl, perbromocycloheptadecyl, perbromooctadecyl, perbromocyclooctadecyl, perbromononadecyl, perbromocyclononadecyl, perbromononaeicosyl, perbromocycloeicosyl, perbromophenyl, perbromobenzyl, perbromoxylyl, perbromomesitylenyl, perbromocumyl, perbromonaphthatyl, perbromodecalyl, 1,1-dibromoethyl, pentabromophenyl, tetrabromophenyl, tribromophenyl, dibromophenyl, hexabromoxylyl, tribromomethylnaphthyl, di-(tribromomethyl)-naphthyl, tribromomethyldecalyl and di-(tribromomethyl)-decalyl. In these halocarbon groups, the halogen atom substituent position is not specially limited, which may be selected in a completely arbitrary manner.

Further in the foregoing formulas related to the constituent (4), $R^8$ denotes $R^6$ or a hydrocarbon group having 1 to 30, preferably 1 to 20, more preferably 1 to 12, carbon atoms, provided in the case where $R^8$ is contained in a plural number in one molecule, the $R^8$s may be the same or different. As examples of such hydrocarbons are mentioned such alkyl groups as methyl, ethyl, propyl, isopropyl, cyclopropyl, butyl, isobutyl, tert-butyl, cyclobutyl, pentyl, isopentyl, neopentyl, cyclopentyl, hexyl, isohexyl, cyclohexyl, heptyl, octyl, decyl, and dodecyl, such alkenyl groups as vinyl and allyl, such aryl groups as phenyl, tolyl, xylyl, mesityl, indenyl, and naphthyl, and such aralkyl groups as benzyl, trityl, phenethyl, styryl, benzhydryl, phenylbutyl, phenylpropyl and neophyl. Of course these hydrocarbon groups may have branches.

$R^9$ denotes $R^8$ or a hydrogen atom, and $R^{10}$ denotes a hydrogen atom or a halogen atoms such as fluorine, chlorine, bromine or iodine.

As examples of compounds represented by the foregoing general formula A are mentioned 3-perfluorohexyl-1,2-epoxpropane, 3-perfluorooctyl-1,2-epoxypropane, 3-perfluorodecyl-1,2-epoxypropane, 3-(perfluoro-3-methylbutyl)-1,2-epoxypropane, 3-(perfluoro-5-methylhexyl)-1,2-epoxypropane, 3-(perfluoro-7-methyloctyl)-1,2-epoxypropane, 3-(perfluoro-9-methyldecyl)-1,2-epoxypropane, 3-perchlorohexyl-1,2-epoxypropane, 3-perchlorooctyl-1,2-epoxypropane, 3-perchlorodecyl-1,2-epoxypropane, 3-(perchloro-3-methylbutyl)-1,2-epoxypropane, 3-(perchloro-5-methylhexyl)-1,2-epoxypropane, 3-(perchloro-7-methyloctyl)-1,2-epoxypropane, 3-(perchloro-9-methyldecyl)-1,2-epoxypropane, 3-perbromohexyl-1,2-epoxypropane, 3-perbromooctyl-1,2-epoxypropane, 3-perbromodecyl-1,2-epoxypropane, 3-(perbromo-3-methylbutyl)-1,2-epoxypropane, 3-(perbromo-5-methylhexyl)-1,2-epoxypropane, 3-(perbromo-7-methyloctyl)-1,2-epoxypropane and 3-(perbromo-9-methyldecyl)-1,2-epoxypropane.

As examples of compounds represented by the foregoing general formula B are mentioned 3-(2,2,3,3-tetrafluoropropoxy)-1,2-epoxypropane, 3-(1H, 1H, 5H-octafluoropentyloxy)-1,2-epoxypropane, 3-(1H, 1H, 7H-dodecafluoroheptyloxy)-1,2-epoxypropane, 3-(1H, 1H, 9H-hexadecafluorononyloxy)-1,2-epoxypropane, 3-(2,2,3, 3-tetrachloropropoxy)-1,2-epoxypropane, 3-(1H, 1H, 5H-octachloropentyloxy)-1,2-epoxypropane, 3-(1H, 1H, 7H-dodecachloroheptyloxy)-1,2-epoxypropane, 3-(1H, 1H, 9H-hexadecachlorononyloxy)-1,2-epoxypropane, 3-(2,2,3, 3-tetrabromopropoxy)-1,2-epoxypropane, 3-(1H, 1H, 5H-octabromopentyloxy)-1,2-epoxypropane, 3-(1H, 1H, 7H-dodecabromoheptyloxy)-1,2-epoxypropane and 3-(1H, 1H, 9H-hexadecabromononyloxy)-1,2-epoxypropane.

As examples of compounds represented by the foregoing general formula C are mentioned 2-trifluoromethylfuran, 2-(1,1,1-trifluoroethyl)furan, 2-(2-trifluoromethyl-1,1,1-trifluoroethyl)furan, 2-trichloromethylfuran, 2-(1,1,1-trichloroethyl)furan, 2-(2-trichloromethyl-1,1,1,-trichloroethyl)furan, 2-tribromomethylfuran, 2-(1,1,1-tribromoethyl)furan and 2-(2-tribromomethyl-1,1,1-tribromoethyl)furan.

As examples of compounds represented by the foregoing general formula D are mentioned 2-trifluoromethyltetrahydrofuran, 2-(1,1,1-trifluoroethyl)tetrahydrofuran, 2-(2-trifluoromethyl-1,1,1-trifluoroethyl)tetrahydrofuran, 2-trichloromethyltetrahydrofuran, 2-(1,1,1-trichloroethyl)tetrahydrofuran, 2-(2-trichloromethyl-1,1,1-trichloroethyl)tetrahydrofuran, 2-tribromomethyltetrahydrofuran, 2-(1,1,1-tribromoethyl) tetrahydrofuran and 2-(2-tribromomethyl-1,1,1-tribromoethyl)tetrahydrofuran.

As examples of compounds represented by the foregoing general formula E are mentioned 2-trifluoromethyltetrahydropyran, 2-(1,1,1-trifluoroethyl) tetrahydropyran, 2-(2-trifluoromethyl-1,1,1-trifluoroethyl) tetrahydropyran, 2-trichloromethyltetrahydropyran, 2-(1,1, 1-trichloroethyl)tetrahydropyran, 2-(2-trichloromethyl-1,1, 1-trichloroethyl)tetrahydropyran, 2-tribromomethyltetrahydropyran, 2-(1,1,1-tribromoethyl) tetrahydropyran and 2-(2-tribromomethyl-1,1,1-tribromoethyl)tetrahydropyran.

As compounds represented by the foregoing general formula F, derivatives of tetrahydrofuranyl ether are suitable. Examples are 2-(2',2',2'-trifluoroethoxy)-tetrahydrofuran, 2-(1'-methyl-2',2',2'-trifluoroethoxy)-tetrahydrofuran, 2-(1'-trifluoromethyl-2',2',2'-trifluoroethoxy)-tetrahydrofuran, 2-(2',2',3',3',3'-pentafluoropropoxy)-tetrahydrofuran, 2-(6'-(perfluoroethyl)-hexyloxy)-tetrahydrofuran, 2-(1'H, 1'H-hexafluorobutoxy)-tetrahydrofuran, 2-(2'-(perfluorobutyl)-ethoxy)-tetrahydrofuran, 2-(2'-(perfluorobutyl)-hexyloxy)-tetrahydrofuran, 2-(2'.2',2'-trichloroethoxy)-tetrahydrofuran, 2-(1'-methyl-2'.2',2'-trichloroethoxy)-tetrahydrofuran, 2-(1'-trichloromethyl-2'.2',2'-trichloroethoxy)-tetrahYdrofuran, 2-(2',2',3',3',3'-pentachloropropoxy)-tetrahydrofuran, 2-(6'-(perchloroethyl)-hexyloxy)-tetrahydrofuran, 2-(1'H, 1'H-hexachlorobutoxy)-tetrahydrofuran, 2-(2'-(perchlorobutyl)-ethoxy)-tetrahydrofuran, 2-(2'-(perchlorobutyl)-hexyloxy)-tetrahydrofuran, 2-(2'.2',2'-tribromoethoxy)-tetrahydrofuran, 2-(1'-methyl-2'.2',2'-tribromoethoxy)-tetrahydrofuran, 2-(1'-tribromomethyl-2'.2',2'-tribromoethoxy)-tetrahydrofuran, 2-(2',2',3',3',3'-pentabromopropoxy)-tetrahydrofuran, 2-(6'-(perbromoethyl)-hexyloxy)-tetrahydrofuran, 2-(1'H, 1'H-hexabromobutoxy)-tetrahydrofuran, 2-(2'-(perbromobutyl)-ethoxy)-tetrahydrofuran and 2-(2'-(perbromobutyl)-hexyloxy)-tetrahydrofuran.

As compounds represented by the foregoing general formula G, derivatives of tetrahydropyranyl ether are suitable. Examples are 2-(2',2',2'-trifluoroethoxy)-tetrahydropyran, 2-(1'-methyl-2',2',2'-trifluoroethoxy)-tetrahydropyran, 2-(1'-trifluoromethyl-2',2',2'-trifluoroethoxy)-tetrahydropyan, 2-(2',2',3',3',3'-pentafluoropropoxy)-tetrahydropyran, 2-(6'-(perfluoroethyl)-hexyloxy)-tetrahydropyran, 2-(1'H, 1'H-hexafluorobutoxy)-tetrahydropyran, 2-(2'-(perfluorobutyl)-ethoxy)-tetrahydropyran, 2-(2'-(perfluorobutyl)-hexyloxy)-tetrahydropyran, 2-(2'.2',2'-trichloroethoxy)-tetrahydropyran, 2-(1'-methyl-2'.2',2'-trichloroethoxy)-tetrahydropyran, 2-(1'-trichloromethyl-2'.2',2'-trichloroethoxy)-tetrahydrofuran, 2-(2',2',3',3',3'-pentachloropropoxy)-tetrahydropyran, 2-(6'-(perchloroethyl)-hexyloxy)-tetrahydropyran, 2-(1H, 1'H-hexachlorobutoxy)-tetrahydropyran, 2-(2'-(perchlorobutyl)-ethoxy)-tetrahydropyran, 2-(2'-(perchlorobutyl)-hexyloxy)-tetrahydropyran, 2-(2'.2',2'-tribromoethoxy)-tetrahydropyran, 2-(1'-methyl-2'.2',2'-tribromoethoxy)-tetrahydropyran, 2-(1'-tribromomethyl-2'.2',2'-tribromoethoxy)-tetrahydrofuran, 2-(2',2',3',3',3'-pentabromopropoxy)-tetrahydropyran, 2-(6'-(perbromoethyl)-hexyloxy)-tetrahydropyran, 2-(1'H, 1'H-hexabromobutoxy)-tetrahydropyran, 2-(2'-(perbromobutyl)-ethoxy)-tetrahydropyran and 2-(2'-(perbromobutyl)-hexyloxy)-tetrahydropyran.

As compounds represented by the foregoing general formula H are mentioned, for example, ether compounds containing at least one halogen atom. More concrete examples are 2,2,3,3,3-pentafluoropropyl-methyl ether, 2,2, 3,3,3-pentafluoropropyl-1,1,2,2-tetrafluoroethyl ether, 1,1,2, 2-tetrafluoroethyl methyl ether, 1,1,2-trifluoro-2-chloroethyl-2,2,2-trifluoroethyl ether, 1,1,3,3,3-pentafluoro-2-trifluoromethyl propyl ether, 2,2,2-trifluoroethyl ether, 2,2,2-trifluoroethyl ethyl ether, 2,2,2-trifluoroethyl butyl ether, 2,2,2-trifluoroethyl benzyl ether, 2,2,2-trifluoroethyl trityl ether, 2,2,3,3-pentafluoropropyl trityl ether, 6-(perfluoroethyl)-hexyltrityl ether, 1H,1H-hexafluorobutyl trityl ether, 2-(perfluorobutyl)ethyl trityl ether, 6-(perfluorobutyl)hexyl trityl ether, 2-perfluorohexylethyl trityl ether, 2-perfluorooctylethyl trityl ether, 2,2,3,3,3-pentaChloropropyl-methyl ether, 2,2,3,3,3-pentachloropropyl-1,1,2,2-tetrachloroethyl ether, 1,1,2,2-tetrachloroethyl methyl ether, 1,1,3,3,3-pentachloro-2-trichloromethyl propyl ether, 2,2,2-trichloroethyl ether, 2,2,2-trichloroethyl ethyl ether, 2,2,2-trichloroethyl butyl ether, 2,2,2-trichloroethyl benzyl ether, 2,2,2-trichloroethyl trityl ether, 2,2,3,3-pentachloropropyl trityl ether, 6-(perchloroethyl)-hexyltrityl ether, 1H,1H-hexachlorobutyl trityl ether, 2-(perchlorobutyl)ethyl trityl ether, 6-(perchlorobutyl)hexyl trityl ether, 2-perchlorohexylethyl trityl ether, 2-perchlorooctylethyl trityl ether, 2,2,3,3,3-pentabromopropyl-methyl ether, 2,2,3,3,3-pentabromopropyl-1,1,2,2-tetrabromoethyl ether, 1,1,2,2-tetrabromoethyl methyl ether, 1,1,3,3,3-pentabromo-2-tribromomethyl propyl ether, 2,2,2-tribromoethyl ether, 2,2,2-tribromoethyl ethyl ether, 2,2,2-tribromoethyl butyl ether, 2,2,2-tribromoethyl benzyl ether, 2,2,2-tribromoethyl trityl ether, 2,2,3,3-pentabromopropyl trityl ether, 6-(perbromoethyl)-hexyltrityl ether, 1H,1H-hexabromobutyl trityl ether, 2-(perbromobutyl)ethyl trityl ether, 6-(perbromobutyl)hexyl trityl ether, 2-perbromohexylethyl trityl ether and 2-perbromooctylethyl trityl ether, As compounds represented by the foregoing general formula I are mentioned, for example, silyl ether compounds containing at least one halogen atom. More concrete examples are 2,2,2-trifluoroethyl trimethylsilyl ether, 2,2,3,3-pentafluoropropyl trimethylsilyl ether, 6-(perfluoroethyl)-hexyl trimethylsilyl ether, 1H,1H-hexafluorobutyl trimethylsilyl ether, 2-(perfluorobutyl)ethyl trimethylsilyl ether, 6-(perfluorobutyl)hexyl trimethylsilyl ether, 2-perfluorohexylethyl trimethylsilyl ether, 2-perfluorooctylethyl trimethylsilyl ether, 2,2,2-trifluoroethyl triphenylsilyl ether, 2,2,3,3-pentafluoropropyl triphenylsilyl ether, 6-(perfluoroethyl)-hexyl triphenylsilyl ether, 1H,1H-hexafluorobutyl triphenylsilyl ether, 2-(perfluorobutyl)ethyl triphenylsilyl ether, 6-(perfluorobutyl)hexyl triphenylsilyl ether, 2-perfluorohexylethyl triphenylsilyl ether, 2-perfluorooctylethyl triphenylsilyl ether, 2,2,2-trichloroethyl trimethylsilyl ether, 2,2,3,3-pentachloropropyl trimethylsilyl ether, 6-(perchloroethyl)-hexyl trimethylsilyl ether, 1H,1H-hexachlorobutyl trimethylsilyl ether, 2-(perchlorobutyl)ethyl trimethylsilyl ether, 6-(perchlorobutyl)hexyl trimethylsilyl ether, 2-perchlorohexylethyl trimethylsilyl ether, 2-perchlorooctylethyl trimethylsilyl ether, 2,2,2-trichloroethyl triphenylsilyl ether, 2,2,3,3-pentachloropropyl triphenylsilyl ether, 6-(perchloroethyl)-hexyl triphenylsilyl ether, 1H,1H-hexachlorobutyl triphenylsilyl ether, 2-(perchlorobutyl)ethyl triphenylsilyl ether, 6-(perchlorobutyl)hexyl triphenylsilyl ether, 2-perchlorohexylethyl triphenylsilyl ether, 2-perchlorooctylethyl triphenylsilyl ether, 2,2,2-tribromoethyl trimethylsilyl ether, 2,2,3,3-pentabromopropyl trimethylsilyl ether, 6-(perbromoethyl)-hexyl trimethylsilyl ether, 1H,1H-hexabromobutyl trimethylsilyl ether, 2-(perbromobutyl)ethyl trimethylsilyl ether, 6-(perbromobutyl)hexyl trimethylsilyl ether, 2-perbromohexylethyl trimethylsilyl ether, 2-perbromooctylethyl trimethylsilyl ether, 2,2,2-tribromoethyl triphenylsilyl ether, 2,2,3,3-pentabromopropyl triphenylsilyl ether, 6-(perbromoethyl)-hexyl triphenylsilyl ether, 1H,1H-hexabromobutyl triphenylsilyl ether, 2-(perbromobutyl)ethyl triphenylsilyl ether, 6-(perbromobutyl)hexyl triphenylsilyl ether, 2-perbromohexylethyl triphenylsilyl ether and 2-perbromooctylethyl triphenylsilyl ether.

As examples of compounds represented by the foregoing general formula J there are mentioned acetal and ketal compounds containing at least one halogen atom in a carbon skelton derived from ketone or aldehyde. More concrete examples are 2,2-dimethoxy-1,1,1,-trifluoropropane, 2,2-diethoxy-1,1,1-trifluoropropane, 2,2-dimethoxy-1,1,1,3,3,3-hexafluoropropane, 2,2-diethoxy-1,1,1,3,3,3-hexafluoropropane, 1,1-dimethoxy-1-pentafluorophenylethane, 1,1-diethoxy-1-pentafluorophenylethane, dimethoxypentafluorophenylmethane, diethoxydipentafluorophenylmethane, 2,2-dimethoxy-1,1,1-trichloropropane, 2,2-diethoxy-1,1,1-trichloropropane, 2,2-dimethoxy-1,1,1,3,3,3-hexachloropropane, 2,2-diethoxy-1,1,1,3,3,3-hexachloropropane, 1,1-dimethoxy-1-pentachlorophenylethane, 1,1-diethoxy-1-pentachlorophenylethane, dimethoxypentachlorophenylmethane, diethoxydipentachlorophenylmethane, 2,2-dimethoxy-1,1,1-tribromopropane, 2,2-diethoxy-1,1,1-tribromopropane, 2,2-dimethoxy-1,1,1,3,3,3-hexabromopropane, 2,2-diethoxy-1,1,1,3,3,3-hexabromopropane, 1,1-dimethoxy-1-pentabromophenylethane, 1,1-diethoxy-1-pentabromophenylethane, dimethoxydipentabromophenylmethane and diethoxydipentabromophenylmethane.

As examples of compounds represented by the general formula K there are mentioned acetal and ketal compounds containing at least one fluorine atom in a carbon skelton derived from alcohol. More concrete examples are 2,2-bis (2,2,2-trifluoroethoxy)-propane, 1,1,-bis(2,2,2-trifluoroethoxy)-cyclohexane, 1,1,-bis(2,2,2-trifluoroethoxy)-1-phenylethane, di(2,2,2-trifluoroethoxy) phenylethane, di(2,2,2-trifluoroethoxy)phenylmethane, 2,2-bis(2,2,2-trichloroethoxy)-propane, 1,1,-bis(2,2,2-trichloroethoxy)-cyclohexane, 1,1,-bis(2,2,2-trichloroethoxy)-1-phenylethane, di(2,2,2-trichloroethoxy) phenylethane, di(2,2,2-trichloroethoxy)phenylmethane, 2,2-bis(2,2,2-tribromoethoxy)-propane, 1,1,-bis(2,2,2-tribromoethoxy)-cyclohexane, 1,1,-bis(2,2,2-tribromoethoxy)-1-phenylethane, di(2,2,2-tribromoethoxy) phenylethane, di(2,2,2-tribromoethoxy)phenylmethane.

As examples of compounds represented by the general formula L there are mentioned orthoester compounds containing at least one halogen atom in a carbon skelton derived from carboxylic acid. More concrete examples are 1,1,1-trimethoxy-2,2,2-trifluoroethane and 1,1,1-triethoxy-2,2,2-trifluoroethane, 1,1,1-trimethoxy-2,2,2-trichloroethane, 1,1,1-triethoxy-2,2,2-trichloroethane, 1,1,1-trimethoxy-2,2,2-tribromoethane and 1,1,1-triethoxy-2,2,2-tribromoethane.

As examples of compounds represented by the general formula M there are mentioned orthoester compounds containing at least one halogen atom in a carbon skelton derived from alcohol. More concrete examples are 1,1,1-tri(2,2,2-trifluoroethoxy)-ethane, 1,1,1-tri(2,2,2-trichloroethoxy)-ethane, 1,1,1-tri(2,2,2-tribromoethoxy)-ethane and 1,1,1-tri (2,2,2-triiodoethoxy)-ethane.

As examples of compounds represented by the general formula N there are mentioned hydrocarbons containing at least one halogen atom. More concrete examples are perfluorohexane, perfluoroheptane, perfluoromethylcyclohexane, perfluorooctane, 1-bromoheptadecafluorooctane, perfluorododecane, perfluoro-2,7-dimethyloctane, perfluoro-2,11-dimethyldodecane, tribromofluoromethane, dibromofluoromethane, 1-bromo-2-fluoromethane, 1,2-dibromo-1,1-difluoroethane, 1,1,1-trichlorotrifluoroethane, 1,1,1,3-tetrachlorotetrafluoropropane, 1,2-dibromohexafluoropropane, 1,1,3,4-tetrachlorohexafluorobutane, 1,1,1,3,5,6-hexachlorooctafluorohexane, 1,1,3,5,6-pentachlorononafluorohexane, hexafluorobenzene, chloropentafluorobenzene, bromopentafluorobenzene, pentafluorobenzene, dichlorotetrafluorobenzene, dibromotetrafluorobenzene, tetrafluorobenzene, trichlorotrifluorobenzene, tribromotrifluorobenzene, trifluorobenzene, tetrachlorodifluorobenzene, tetrabromodifluorobenzene, difluorobenzene, fluorobenzene, perfluorotoluene, perfluoromethylcyclohexane, trifluoromethylbenzene, benzyl fluoride, bistrifluoromethylbenzene, octafluoronaphthalene, perfluorodecalin, perfluoromethyldecalin, perfluorobiphenyl, dichloromethane, chloroform, 1,1-dichloroethane, 1,2-dichlorethane, 1,1,1-trichloroethane, 1,1,2-trichloroethane, 1,1-dichloropropane, 1,2-dichloropropane, 1,3-dichloropropaneperchlorohexane, perchloroheptane, perchloromethylcychlorohexane, perchlorooctane, perchlorododecane, perchloro-2,7-dimethyloctane, perchloro-2,11-dimethyldodecane, hexachlorobenzene, pentachlorobenzene, tetrachlorobenzene, trichlorobenzene, dichlorobenzene, chlorobenzene, perchlorotoluene, perchloromethylcyclohexane, trichloromethylbenzene, benzyl chloride, bistrichloromethylbenzene, octachloronaphthalene, perchlorodecalin, perchlorobiphenyl, perbromohexane, perbromoheptane, perbromomethylcyclohexane, perbromooctane, perbromododecane, perbromo-2,7-dimethyloctane, perbromo-2,1-dimethyldodecane, hexabromobenzene, pentabromobenzene, tetrabromobenzene, tribromobenzene, dibromobenzene, bromobenzene, perbromotoluene, perbromomethylcyclohexane, tribromomethylbenzene, benzyl bromide, bistribromomethylbenzene, octabromonaphthalene, perbromodecalin and perbromobiphenyl.

Of the foregoing general formulas, general formulas H and I are preferred, and among the compounds referred to above, particularly preferred are 3-perfluorohexyl-1,2-epoxypropane, 2-trifluoromethylfuran, 2-trifluoromethyltetrahydrofuran, 2-trifluoromethyltetrahydropyran, 2,2,2-trifluoroethyl benzyl ether, 2,2,3,3-pentafluoropropyl trityl ether, 1H,1H-hexafluorobutyl trityl ether, 2,2,2-trifluoroethyl triphenylsilyl ether, 2,2,3,3-pentafluoropropyl triphenylsilyl ether, 1H,1H-hexafluorobutyl triphenylsilyl ether, 2,2-dimethoxy-1,1,1-trifluoropropane, 2,2-diethoxy-11,1,1-trifluoropropane, 2,2-dimethoxy-1,1,1,3,3,3-hexafluoropropane, 2,2-diethoxy-1,1,1,3,3,3-hexafluoropropane, 2,2-bis(2,2,2-trifluoroethoxy)-propane, 1,1-bis(2,2,2-trifluoroethoxy)-cyclohexane, 1,1,1-trimethoxy-2,2,2-trifluoroethane, 1,1,1-triethoxy-2,2,2-trifluoroethane, 1,1,1-tri(2,2,2-trifluoroethoxy)-ethane, hexafluorobenzene, perfluorotoluene, bistrifluoromethylbenzene, dichloroethane, chloroform, 1,1-dichloroethane, 1,2-dichloroethane, 1,1,1-trichloroethane, 1,1,2-trichloroethane, 2-(2',2',2'-trifluoroethoxy)-tetrahydrofuran, 2-(1'-methyl-2',2',2'-trifluoroethoxy)-tetrahydrofuran, 2-(1'-trifluoromethyl-2',2',2'-trifluoroethoxy)-tetrahydrofuran, 2-(2',2',2'-trifluoroethoxy)-tetrahydropyran, 2-(1'-methyl-2',2',2'-trifluoroethoxy)-tetrahydropyran and 2-(1'-trifluoromethyl-2',2',2'-trifluoroethoxy)-tetrahydropyran.

Modified organoaluminum compounds employable in the present invention each have 1 to 100, preferably 1 to 50, Al—O—Al bonds in the molecule thereof. They may be linear or cyclic. Such Modified organoaluminum compounds are each obtained usually the reaction of an organoaluminum compound and water.

This reaction is carried out usually in an inert hydrocarbon. As the inert hydrocarbon there may be used any of aliphatic, alicyclic and aromatic hydrocarbons such as pentane, hexane, heptane, cyclohexane, methylcyclohexane, benzene, toluene and xylene, with aliphatic and aromatic hydrocarbons being preferred.

As the organoaluminum compounds used in preparing the modified organoaluminum compounds there may be used any of compounds represented by the general formula $R^{11}_a AlX^3_{3-a}$ where $R^{11}$ is a hydrocarbon group such as an alkyl, alkenyl, aryl or aralkyl group having 1 to 18, preferably 1 to 12, carbon atoms, $X^3$ is a hydrogen atom or a halogen atom, and a is an integer satisfying the condition of $1 \leq a \leq 3$. Preferably, a trialkylaluminum compound is used. The alkyl, group in the trialkylaluminum may be any of methyl, ethyl, propyl, isopropyl, butyl, isobutyl, pentyl, hexyl, octyl, decyl, and dodecyl with methyl being particularly preferred.

The reaction ratio (water/Al mol ratio) of water to the organoaluminum compound is preferably in the range from 0.15/1 to 1.2/1, more preferably 0.5/1 to 1/1. The reaction temperature is usually in the range from −70° C. to 100° C., preferably −20° C. to 20° C., and a suitable reaction time is selected usually in the range from 5 minutes to 24 hours, preferably 10 minutes to 5 hours. As the water required for the reaction there may be used not only the so-called water but also water of crystallization contained in copper sulfate hydrate, aluminum sulfate hydrate, etc.

A modified organoaluminum compounds prepared by the reaction of an alkylaluminum compound water is usually called aluminoxane, with methylaluminoxane (or one consisting substantially of methylaluminoxane) being particularly preferred. Of course, two or more modified organoaluminum compounds may be combined for use.

According to the present invention, olefins are homopolymerized or copolymerized in the presence of a catalyst comprising the above catalyst component and promotor component exemplified by the modified organoaluminum compound. In this case, the catalyst component and the modified organoaluminum compound may be fed into the polymerization reaction system separately or as a mixture of the two. One or both may be supported on an inorganic carrier typified by magnesium compounds, alumina, silica and silica-alumina and/or a particulate polymer carrier. In any case, suitable proportions of the catalyst component and the modified organoaluminum compound are selected in such a manner that an atomic ratio of aluminum contained in the modified organoaluminum compound to the transition metal in the catalyst component is in the range of 1 to 100,000, preferably 5 to 1,000.

As described above, the olefin polymerizing catalyst component of the present invention is prepared by contacting its essential constituents with one another which constituents are (1) a compound [constituents (1)] represented by the general formula $Me^1R^1_p(OR^2)_qX^1_{4-p-q'}$ (2) at least one compound [constituents (2)] selected from those of general formula $Me^2R^3_m(OR^4)_nX^2_{z-m-n}$, general formula, $Me^3H_aR^5_{3-a}$, general formula $Me^4[Me^3H_bR^6_c(OR^7)_{a-b-c}]_y$, and/or general formula,

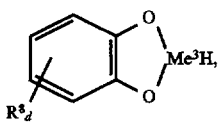

(3) an organocyclic compound [constituents (3)] having two or more conjugated double bonds and (4) a carbon-halogen bond-containing compound [constituents (4)]. By further adding a modified organoaluminum compound [constituents (5)] containing Al—O—Al bond, followed by mutual contact, there is obtained a catalyst for use in the present invention. As to in what order these constituents are to be contacted, there is no special limitation. For example, the catalyst component of the present invention can be obtained by contacting its constituents in accordance with any of the following methods:

1. A method involving adding (2) to (1), then adding (3), and further adding (4).
2. A method involving adding (2) to (1), then adding (4), and further adding (3).
3. A method involving adding (3) to (1), then adding (2), and further adding (4).
4. A method involving adding (3) to (1), then adding (4), and further adding (2).
5. A method involving adding (4) to (1), then adding (2), and further adding (3).
6. A method involving adding (4) to (1), then adding (3), and further adding (2).
7. A method involving adding (1) to (2), then adding (3), and further adding (4).
8. A method involving adding (1) to (2), then adding (4), and further adding (3).
9. A method involving adding (3) to (2), then adding (1), and further adding (4).
10. A method involving adding (3) to (2), then adding (4), and further adding (1).
11. A method involving adding (4) to (2), then adding (1), and further adding (3).
12. A method involving adding (4) to (2), then adding (3), and further adding (1).
13. A method involving adding (1) to (3), then adding (2), and further adding (4).
14. A method involving adding (1) to (3), then adding (4), and further adding (2).
15. A method involving adding (2) to (3), then adding (1), and further adding (4).
16. A method involving adding (2) to (3), then adding (4), and further adding (1).
17. A method involving adding (4) to (3), then adding (1), and further adding (2).
18. A method involving adding (4) to (3), then adding (2), and further adding (1).
19. A method involving adding (1) to (4), then adding (2), and further adding (3).
20. A method involving adding (1) to (4), then adding (3), and further adding (2).
21. A method involving adding (2) to (4), then adding (1), and further adding (3).
22. A method involving adding (2) to (4), then adding (3), and further adding (1).
23. A method involving adding (3) to (4), then adding (1), and further adding (2).
24. A method involving adding (3) to (4), then adding (2), and further adding (1).

Further, the catalyst used in the present invention can be prepared by contacting its constituents in accordance with any of the following methods:

A. A method involving adding (1), (2), (3), (4) and (5) at a time.
B. A method involving mixing (1), (2), (3) and (4), [the resulting mixture will hereinafter be referred to as constituent (6)], and adding (5).
C. A method involving mixing (1), (2), (3) and (5), [onstituent (7) hereinafter], and adding (4).
D. A method involving mixing (1), (2), (4) and (5), [constituent (8) hereinafter], and adding (3).
E. A method involving mixing (1), (3), (4) and (5), [constituent (9) hereinafter], and adding (2).
F. A method involving mixing (2), (3), (4) and (5), [constituent (10) hereinafter], and adding (1).
G. A method involving mixing (2), (3) and (4) [constituent (11) hereinafter], and adding (1) and (5).
H. A method involving mixing (2), (3) and (5), [constituent (12) hereinafter], and adding (1) and (4).
I. A method involving mixing (2), (4) and (5), [constituent (13) hereinafter], and adding (1) and (3).
J. A method involving mixing (3), (4) and (5), [constituent (14) hereinafter], and adding (1) and (2).
K. A method involving mixing (1), (4) and (5) [constituent (15) hereinafter], and adding (2) and (3).
L. A method involving mixing (1), (3) and (5), [constituent (16) hereinafter], and adding (2) and (4).
M. A method involving mixing (1), (3) and (4), [constituent (17) hereinafter], and adding (2) and (5).
N. A method involving mixing (1), (2) and (4), [constituent (18) hereinafter], and adding (3) and (5).
O. A method involving mixing (1), (2) and (5), [constituent (19) hereinafter], and adding (3) and (4).
P. A method involving mixing (1), (2) and (3), [constituent (20) hereinafter], and adding (4) and (5).
R. A method involving mixing constituent (6) and (7).
S. A method involving mixing constituent (6) and (8).
T. A method involving mixing constituent (6) and (9).
U. A method involving mixing constituent (6) and (10).
V. A method involving mixing constituent (7) and (8).
X. A method involving mixing constituent (7) and (9).
Y. A method involving mixing constituent (7) and (10).
Z. A method involving mixing constituent (8) and (9).
AA. A method involving mixing constituent (8) and (10).
AB. A method involving mixing constituent (9) and (10).
AC. A method involving further adding (1) in method A.
AD. A method involving further adding (2) in method A.
AE. A method involving further adding (3) in method A.
AF. A method involving further adding (4) in method A.
AG. A method involving further adding (5) in method A.
AH. A method involving further adding (1) in method B.
AI. A method involving further adding (2) in method B.
AJ. A method involving further adding (3) in method B.
AK. A method involving further adding (4) in method B.
AL. A method involving further adding (5) in method B.

AM. A method involving further adding (1) in method C.
AN. A method involving further adding (2) in method C.
AO. A method involving further adding (3) in method C.
AP. A method involving further adding (4) in method C.
AQ. A method involving further adding (5) in method C.
AR. A method involving further adding (1) in method D.
AS. A method involving further adding (2) in method D.
AT. A method involving further adding (3) in method D.
AU. A method involving further adding (4) in method D.
AV. A method involving further adding (5) in method D.
AW. A method involving further adding (1) in method E.
AX. A method involving further adding (2) in method E.
AY. A method involving further adding (3) in method E.
AZ. A method involving further adding (4) in method E.
AAA. A method involving further adding (5) in method E.
AAB. A method involving further adding (1) in method F.
AAC. A method involving further adding (2) in method F.
AAD. A method involving further adding (3) in method F.
AAE. A method involving further adding (4) in method F.
AAF. A method involving further adding (5) in method F.

In the above methods, the catalyst constituents are mixed outside the polymerization system and then introduced into the polymerization system.

The catalyst constituents may be added directly into the polymerization system in accordance with any of the orders shown in the above methods A to AAF. Or there may be adopted a method wherein the constituents (6), (7), (8), (9) and (10) are each prepared outside the polymerization system and then add into the polymerization system together with the remaining one constituent. Or there may be adopted a method wherein the constituents (11), (12), (13), (14), (15), (16), (17), (18), (19) and (20) are each prepared outside the polymerization system and then add into the polymerization system in combination with any of the following methods:

a. A method wherein (1) and (5) are added in this order into the polymerization system.
b. A method wherein (1) and (4) are added in this order into the polymerization system.
c. A method wherein (1) and (3) are added in this order into the polymerization system.
d. A method wherein (1) and (2) are added in this order into the polymerization system.
e. A method wherein (2) and (3) are added in this order into the polymerization system.
f. A method wherein (2) and (4) are added in this order into the polymerization system.
g. A method wherein (2) and (5) are added in this order into the polymerization system.
h. A method wherein (3) and (5) are added in this order into the polymerization system.
i. A method wherein (3) and (4) are added in this order into the polymerization system.
j. A method wherein (4) and (5) are added in this order into the polymerization system.

Further, there may be adopted a method wherein the constituents (1), (2), (3), (4) and (5) are contacted with one another in accordance with any of the above methods A to AAF to prepare a catalyst [constituent (21) hereinafter] and then the constituent (21) is add into the polymerization system in accordance with any of the following methods:

k. A method wherein (21), (4) and (5) are added in this order into the polymerization system.
l. A method wherein (21), (5) and (4) are added in this order into the polymerization system.
m. A method wherein (4), (5) and (21) are added in this order into the polymerization system.
n. A method wherein (5), (4) and (21) are added in this order into the polymerization system.

Other methods are also employable, but particularly preferred are the method wherein constituents (1), (2) and (3) are mixed together in advance, the resulting mixture is added to constituent (5), followed by further addition of constituent (4), and the method wherein constituents (1), (2), (3) and (4) are mixed together in advance and the resulting mixture is added to constituent (5).

Also regarding how to contact the five constituents, there may be adopted any suitable method. According to a method adopted usually, the constituents (1), (2), (3), (4) and (5) are contacted in an inert atmosphere such as a nitrogen or argon atmosphere in the presence of an inert hydrocarbon solvent such as heptane, hexane, benzene, toluene or xylene, at a temperature usually in the range from $-100°$ C. to $200°$ C, preferably $-50°$ C. to $100°$ C., for 30 minutes to 50 hours, preferably 2 to 24 hours.

In the case where the constituents are contacted in an inert hydrocarbon solvent, the resulting catalyst may be used in the polymerization in the state of solution directly after completion of all the contact reactions. Alternatively and if possible, the catalyst may be once withdrawn as a solid catalyst through precipitation, drying, or any other suitable means and thereafter used in the polymerization. Of course, each contact reaction may be performed by a plural number of times.

As to the proportions of the five constituents, it is desirable that, per mol of constituent (1), the proportion of constituent (2) be in the range of 0.01 to 1,000 mols, more preferably 0.1 to 100 mols, still more preferably 0.5 to 50 mols, that of constituent (3), 0.01 to 1,000 mols, more preferably 0.1 to 100 mols, still more preferably 0.5 to 50 mols, that of constituent (4), 0.01 to 1,000 mols, more preferably 0.1 to 50 mols, still more preferably 0.5 to 10 mols, and that of constituent (5), 1 to 1,000 mols, more preferably 1 to 500 mols, still more preferably 1 to 100 mols.

In the olefins referred to herein there are included α-olefins, cyclic olefins, dienes, trienes and styrene analogs. Examples of α-olefins include those having 2 to 12, preferably 2 to 8, carbon atoms. More concrete examples are ethylene, propylene, butene-1, hexene-1 and 4-methylpentene-1. An α-olefin can be homopolymerized using the catalyst component of the invention and it is also possible to copolymerize two or more kinds of α-olefins using such catalyst component. The copolymerization may be any of alternating copolymerization, random copolymerization and block copolymerization.

In the copolymerization of α-olefins there are included the case where ethylene and an α-olefin having 3 to 12, preferably 3 to 8, carbon atoms are copolymerized, such as ethylene/pr.opylene, ethylene/butene-1, ethylene/hexene-1, and ethylene/4-methylpentene-1, and the case where propylene and an α-olefin having 3 to 12, preferably 3 to 8, carbon atoms are copolymerized, such as propylene/butene-1, propylene/4-methylpentene-1, propylene/4-methylbutene-1, propylene/hexene-1 and propylene/octene-1. In the case of copolymerizing ethylene or propylene with another α-olefin, the amount of such α-olefin may be selected optionally on condition that it does not exceed 90 mol % of the total monomer quantity. Generally, however, in the case of an ethylene copolymer, the amount of such another α-olefin is not larger than 40 mol %, preferably not larger than 30 mol %, more preferably not larger than 20 mol %, while in the case of a propylene copolymer, the amount of such another α-olefin is selected in the range of 1–90 mol %, preferably 5–90 mol %, more preferably 10–70 mol %.

Examples of cyclic olefins employable in the invention are those having 3 to 24 preferably 3 to 18, carbon atoms, including cyclopentene, cyclobutene, cyclohexene, 3-methylcyclohexene, cyclooctene, cyclodecene, cyclododecene, tetracyclodecene, octacyclodecene, norbornene, 5-methyl-2-norbornene, 5-ethyl-2-norbornene, 5-isobutyl-2-norbornene, 5,6-dimethyl-2-norbornene, and 5,5,6-trimethyl-2-norbornene. Usually, a cyclic olefin is copolymerized with the foregoing α-olefins and in this case the amount of the cyclic olefin is not larger than 50 mol %, usually in the range of 1–50 mol %, preferably 2–50 mol %, relative to the copolymer.

Dienes and trienes employable in the present invention are polyenes having 4 to 26, preferably 6 to 26, carbon atoms. Example are butadiene, 1,3-pentadiene, 1,4-pentadiene, 1,3-hexadiene, 1,4-hexadiene, 1,5-hexadiene, 1,3-cyclohexadiene, 1,4-cyclohexadiene, 1,9-decadiene, 1,13-tetradecadiene, 2,6-dimethyl-1,5-heptadiene, 2-methyl-2,7-octadiene, 2,7-dimethyl-2,6-octadiene, 2,3-dimethylbutadiene, ethylidene norbornene, dicyclopentadiene, isoprene, 1,3,7-octaroriene, and 1,5,9-decartriene. In the case of using a chain diene or triene in the present invention, it is usually copolymerized with the foregoing α-olefin, and the content of chain diene and/or triene in the copolymer is usually in the range of 0.1 to 50 mol %, preferably 0.2 to 10 mol %.

Styrene analogs employable in the present invention are styrene and styrene derivatives. As examples of such derivatives there are mentioned t-butylstyrene, α-methylstyrene, p-methylstyrene, divinylbenzene, 1,1-diphenylethylene, N,N-dimethyl-p-aminoethylstyrene and N,N-diethyl-p-aminoethylstyrene.

The catalyst component of the present invention is also suitable for use in further polymerizing a homopolymer or a copolymer of olefin(s) with a polar monomer for the purpose of modification of the homopolymer or copolymer. As examples of such polar monomer there are mentioned unsaturated carboxylic acid esters such as methyl acrylate, methyl methacrylate, butyl methacrylate, dimethyl maleate, diethyl maleate, monomethyl maleate, diethyl fumarate and dimethyl itaconate. The polar monomer content of the copolymer thus modified is usually 2 mol %.

The polymerization reaction may be carried out in the form of slurry polymerization, solution polymerization or gas-phase polymerization in the presence of a catalyst comprising the catalyst component and promotor component described above. Particularly, a slurry polymerization or a gas-phase polymerization is preferred. Olefin(s) is polymerized in a substantially oxygen- and water-free condition and in the presence or absence of an inert hydrocarbon solvent selected from aliphatic hydrocarbons such as hexane and heptane, aromatic hydrocarbons such as benzene, toluene and xylene and alicyclic hydrocarbons such as cyclohexane and methylcyclohexane. Conditions for the polymerization involve a temperature in the range of 20° to 200° C., preferably 50° to 100° C., a pressure in the range from atmospheric pressure to 70 kg/cm$^2$G, preferably from atmospheric pressure to 20 kg/cm$^2$G, and a polymerization time in the range from 5 minutes to 10 hours, preferably 5 minutes to 5 hours.

The molecular weight of the polymer to be prepared can be adjusted to some extent by changing polymerization conditions such as polymerization temperature and catalyst mole ratio, but the addition of hydrogen to the polymerization reaction system is more effective for this purpose.

A component for the removal of water, the so-called scavenger, may be added into the polymerization system. As examples of such scavenger are mentioned organoaluminum compounds typical of which are such trialkylaluminum compounds as trimethylaluminum, triethylaluminum, tripropylaluminum, triisopropylaluminum, and triisobutylaluminum, as well as the foregoing modified organoaluminum compounds, modified organoaluminum compounds having branched alkyl groups, organolithium compounds, e.g. butyllithium, and organomagnesium compounds such as diethylmagnesium, dibutylmagnesium, butylmagnesium chloride.

The process of the present invention is also applicable to a multi-stage polymerization of two or more stages involving different polymerization conditions such as different hydrogen concentrations, different monomer concentrations, and different polymerization pressures and temperatures.

Prior to the regular polymerization, an olefin or olefins may be contacted with the catalyst, allowing prepolymerization to proceed, and thereafter the resulting prepolymer may be fed to the regular polymerization.

[EXAMPLES]

The present invention will be described below concretely by way of working examples and comparative examples. Reference will first be made to the preparation of modified organoaluminum compound and catalyst component used in the working and comparative examples.

Preparation of Modified Organoaluminum Compound (Methylaluminoxane)

13 g of copper sulfate pentahydrate was placed in a three-necked flask having an internal volume of 300 ml and equipped with an electromagnetic induction stirrer and was suspended in 50 ml of toluene. Then, 150 ml of a solution containing 1 mmol/ml of trimethylaluminum was added dropwise into the resulting suspension at 0° C. over a 2 hour period. Thereafter, the temperature was raised to 25° C. and reaction was allowed to take place at that temperature for 24 hours. Subsequently, the reaction solution was filtered to remove toluene from the solution containing the reaction product, thereby affording 4 g of methylaluminoxane (MAO) as white crystals.

The following methods were adopted to determine physical properties of the polymers obtained in the following working and comparative examples.

Melt Flow Rate (MFR)

Determined at 190° C. under a load of 2.16 kg according to ASTM D 1238-57T.

Density

Determined according to ASTM D 1505-68.

Determination of Melting Point using Differential Scanning Calorimeter (DSC)

Using a melting point measuring device Model DSC-20 (a product of Seiko Denshi K. K.), a polymer sample (5 mg) is held at 180° C. for 3 minutes, then cooled to 0° C. at a rate of 10° C/min, and after holding the sample at 0° C. for 10 minutes, the temperature is raised at a rate of 10° C./min to determine the melting point.

Mw/Mn

Determined using a Type 150C GPC device (a product of Water Co.), a column of GMH-6 (a product of Toyo Soda Manufacturing Co.), a solvent of o-dichlorobenzene, and under the conditions of temperature 135° C, flow rate 1.0 ml/min.

Determination by Temperature Rising Elution Fractionation ("TREF" hereinafter)

TREF was performed by dissolving an olefin copolymer in o-dichlorobenzene, followed by cooling, allowing a polymer layer to be formed in diatomaceous, thereafter raising the temperature in a continuous manner and detecting eluted components continuously.

Example 1

200 g of sea sand which had been washed with an acid and then heat-treated at 300° C. was fed into a 2-liter autoclave and dried thoroughly. Tetrabutoxyzirconium (0.11 g), trihexylaluminum (0.69 ml), 1,2-bisindenylethane (0.1 g) and 2,2,2-trifluoroethyl trityl ether ($3.0 \times 10^{-4}$ mol) were dissolved in 13 ml of toluene to prepare a catalyst component solution. Then, a solution of methylaluminoxane in toluene [Al/Zr=100 (molar ratio)] was added into 0.5 ml of the catalyst component solution and stirring was performed at room temperature for 30 minutes to afford a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 134 kg/g. Zr, density was 0.9208 g/cm$^3$, MFR 3.5 g/10 min (190° C.), melting point 112.3° C., and Mw/Mn 7.5. From a sharp peak in TREF it turned out that the composition distribution was very narrow.

Example 2

200 g of sea sand which had been washed with an acid and then heat-treated at 300° C. was fed into a 2-liter autoclave and dried thoroughly. Tetrabutoxyzirconium (0.22 g), triethylaluminum (0.19 ml), indene (0.23 ml) and 2,2,2-trifluoroethyl triphenylsilyl ether ($5.0 \times 10^{-4}$ mol) were dissolved in 13 ml of toluene to prepare a catalyst component solution. Then, a solution of methylaluminoxane in toluene [Al/Zr=100 (molar ratio)] was added into 0.5 ml of the catalyst component solution and stirring was performed at room temperature for 30 minutes to afford a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 140 kg/g. Zr, density was 0.9210 g/cm$^3$ MFR 0.5 g/10 min (190° C.) melting point 116.2° C., and Mw/Mn 9.3.

Example 3

200 g of sea sand which had been washed with an acid and then heat-treated at 300° C. was fed into a 2-liter autoclave and dried thoroughly. Tributoxymonochlorozirconium (0.26 g), diethylaluminum chloride (0.28 ml), indene (0.28 ml) and 3-perfluorohexyl-1,2-epoxypropane ($4.4 \times 10^{-5}$ mol) were dissolved in 17 ml of toluene to prepare a catalyst component solution. Then, a solution of methylaluminoxane in toluene [Al/Zr=100 (molar ratio)] was added into 0.5 ml of the catalyst component solution and stirring was performed at room temperature for 30 minutes to give a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 20 kg/g. Zr, density was 0.9284 g/cm$^3$, MFR 1.2 g/10 min (190° C.), melting point 116.7° C., and Mw/Mn 9.6.

Example 4

200 g of sea sand which had been washed with an acid and then heat-treated at 300° C. was fed into a 2-liter autoclave and dried thoroughly. Dibutoxydichlorozirconium (0.26 g), diethylaluminum chloride (0.28 ml), indene (0.28 ml) and perfluoromethylcyclohexane ($4.4 \times 10^{-5}$ mol) were dissolved in 17 ml of toluene to prepare a catalyst component solution. Then, a solution of methylaluminoxane in toluene [Al/Zr=100 (molar ratio)] was added into 0.5 ml of the catalyst component solution and stirring was performed at room temperature for 30 minutes to give a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 22 kg/g. Zr, density was 0.9201 g/cm$^3$. MFR 0.3 g/10 min (190° C.), melting point 112.3° C., and Mw/Mn 7.5.

Example 5

200 g of sea sand which had been washed with an acid and then heat-treated at 300° C. was fed into a 2-liter autoclave and dried thoroughly. Tetrabutoxytitanium (0.13 g), diethylaluminum chloride (0.29 ml), indene (0.35 ml) and 2,2-bisethoxy-1,1,1,3,3,3-hexafluoropropane ($3.8 \times 10^{-4}$ mol) were dissolved in 17 ml of toluene to prepare a catalyst component solution. Then, a solution of methylaluminoxane in toluene [Al/Ti=1,000 (molar ratio)] was added into 0.5 ml of the catalyst component solution and stirring was performed at room temperature for 30 minutes to prepare a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 29 kg/g. Ti, density was 0.9230 g/cm$^3$, MFR 0.82 g/10 min (190° C.), melting point 117.5° C., and Mw/Mn 8.2.

Example 6

200 g of sea sand which had been washed with an acid and then heat-treated at 300° C. was fed into a 2-liter autoclave and dried thoroughly. Tetrapropoxyzirconium (0.29 g), diethylethoxyaluminum (1.16 g) indene (0.41 ml) were dissolved in 40 ml of toluene, into which was further added 2,2-bis-(2,2,2-trifluoroethoxy)propane ($8.9 \times 10^{-5}$ mol) and stirring was performed at room temperature for 30 minutes to prepare a catalyst. component solution. Then, a solution of methylaluminoxane in toluene [Al/Zr=100 (molar ratio)] was added into 0.5 ml of the catalyst component solution followed by stirring at room temperature for 30 minutes to give a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 130 kg/g.Zr, density was 0.9230 g/cm$^3$, MFR 1.5 g/10 min (190° C), melting point 114.2° C., and Mw/Mn 7.0.

Example 7

200 g of sea sand which had been washed with an acid and then heat-treated at 300° C. was fed into a 2-liter autoclave and dried thoroughly. Tetrapropoxyhafnium (0.23 g), triethylaluminum (0.38 ml), indene (0.23 ml) and chloropentafluorobenzene ($1.1 \times 10^{-3}$ mol) were dissolved in 25 ml of toluene to prepare a catalyst component solution. Further, a solution of methylaluminoxane in toluene [Al/Hf=500 (molar ratio)] was added into the catalyst component solution and stirring was performed at room temperature for 30 minutes to give a solution of a desired catalyst. This catalyst solution was then charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 40 kg/g.Hf, density was 0.9230 g/cm$^3$, MFR 0.9 g/10 min (190° C.), melting point 117.2° C., and Mw/Mn 8.9.

Example 8

500 ml of purified toluene was fed into a thoroughly dried 2-liter autoclave. Tetrabutoxyzirconium (0.11 g), trihexylaluminum (0.69 ml), 1,2,4-trimethylcyclopentadiene (0.31 g) and trifluoroethyl trityl ether (2.2×10$^{-4}$ mol) were dissolved in 13 ml of toluene to prepare a catalyst component solution. Then, a solution of methylaluminoxane in toluene [Al/Zr= 500 (molar ratio)] was added into 0.5 ml of the catalyst component solution and stirring was performed at room temperature for 30 minutes to afford a solution of a desired catalyst. This catalyst solution was then charged into the 2-liter autoclave and polymerization was conducted at 60° C. for 2 hours while introducing propylene gas continuously to maintain the total pressure at 9 atm. Catalytic efficiency was 160 kg/g. Zr, Mw was 15,000, and Mw/Mn 3.5.

Example 9

200 g of sea sand which had been washed with an acid and then heat-treated at 300° C. was fed into a 2-liter autoclave and dried thoroughly. Tetrabutoxyzirconium (0.11 g), trihexylaluminum (0.69 ml) and indene (0.23 ml) were dissolved in 13 ml of toluene. Into 0.5 ml of the resulting solution was then added a solution of methylaluminoxane in toluene [Al/Zr=100 (molar ratio)] and stirring was performed at room temperature for 30 minutes. Further added was 2,2,2-trifluoroethyl trityl ether (2.2×10$^{-5}$ mol), followed by stirring at room temperature for 30 minutes. The resulting solution was charged into the 2-liter autoclave and polymerization was carried out at 60° C. for 2 hours while introducing a gaseous mixture of ethylene and 1-butene (butene/ ethylene=0.2) continuously to maintain the total pressure at 9 atm. Catalytic efficiency was 134 kg/g.Zr, density was 0.9208 g/cm$^3$ MFR 3 5 g/10 min (190° C.) melting point 112.3° C., and Mw/Mn 7.5.

Example 10

200 g of sea sand which had been washed with an acid and then heat-treated at 300° C. was fed into a 2-liter autoclave and dried thoroughly. Tetrabutoxyzirconium (0.22 g), n-butyllithium (5 mmol) and indene (0.24 ml) were dissolved in 13 ml of toluene. Into 0.5 ml of the resulting solution was then added a solution of methylaluminoxane in toluene [Al/Zr=100 (molar ratio)] and stirring was performed at room temperature for 30 minutes. Further added was hexafluorobenzene (2.2×10$^{-5}$ mol), followed by stirring at room temperature for 30 minutes. The resulting solution was charged into the 2-liter autoclave and polymerization was carried out at 60° C. for 2 hours while introducing a gaseous mixture of ethylene and 1-butene (butene/ethylene =0.2) continuously to maintain the total pressure at 9 atm. Catalytic efficiency was 33 kg/g.Zr, density was 0.9220 g/cm$^3$, MFR 1.2 g/10 min (190° C.), melting point 116.3° C., and Mw/Mn 9.1.

Example 11

200 g of sea sand which had been washed with an acid and then heat-treated at 300° C. was fed into a 2-liter autoclave and dried thoroughly. Tetrabutoxytitanium (0.13 g), dibutylmagnesium (5 mmol) and indene (0.35 ml) were dissolved in 17 ml of toluene. Into 0.5 ml of this solution was then added a solution of methylaluminoxane in toluene [Al/Ti=1,000 (molar ratio)π and stirring was performed at room temperature for 30 minutes. Further added was 1,1,1-triethoxy-2,2,2-trifluoroethane (2.2×10$^{-5}$ mol), followed by stirring at room temperature for 30 minutes. The resulting solution was charged into the 2-liter autoclave and polymerization was carried out at 60° C. for 2 hours while introducing a gaseous mixture of ethylene and 1-butene (butene/ ethylene=0.2) continuously to maintain the total pressure at 9 atm. Catalytic efficiency was 30 kg/g.Ti, density was 0.9270 g/cm$^3$, MFR 0.01 g/10 min (190° C.), melting point 119.3° C., and Mw/Mn 7.5.

Example 12

200 g of sea sand which had been washed with an acid and then heat-treated at 300° C. was fed into a 2-liter autoclave and dried thoroughly. Tetrapropoxyzirconium (0.29 g), diethylethoxyaluminum (0.12 g) and 1,3-dimethylcyclopentadiene (0.08 g) were dissolved in 40 ml of toluene. Into 0.5 ml of the resulting solution was then added a solution of methylaluminoxane in toluene [Al/Zr=100 (molar ratio)] and stirring was performed at room temperature for 30 minutes. Further added was 1,1,1-tri-(2,2,2-trifluoroethoxy)ethane (2.2×10$^{-5}$ mol), followed by stirring at room temperature for 30 minutes. The resulting solution was charged into the 2-liter autoclave and polymerization was carried out at 60° C. for 2 hours while introducing a gaseous mixture of ethylene and 1-butene (butene/ethylene= 0.2) continuously to maintain the total pressure at 9 atm. Catalytic efficiency was 130 kg/g.Zr, density was 0.9200 g/cm$^3$, MFR 0.6 g/10 min (190° C.), melting point 113.2° C., and Mw/Mn 6.5.

Example 13

200 g of sea sand which had been washed with an acid and then heat-treated at 300° C. was fed into a 2-liter autoclave and dried thoroughly. Tetrapropoxyzirconium (0.29 g), diethylethoxyaluminum (0.12 g) and 1,3-dimethylcyclopentadiene (0.08 g) were dissolved in 40 ml of toluene. Into 0.5 ml of the resulting solution was then added a solution of methylaluminoxane in toluene [Al/Zr=100 (molar ratio)] and stirring was performed at room temperature for 30 minutes. Further added was 1,1,1-tri-(2,2,2-trifluoroethoxy) ethane (2.2×10$^{-5}$ mol), followed by stirring at room temperature for 30 minutes. The resulting solution was charged into the 2-liter autoclave and polymerization was carried out at 60° C. for 2 hours while introducing ethylene gas continuously to maintain the total pressure at 9 atm. Catalytic efficiency was 30 kg/g.Zr, density was 0.9630 g/cm$^3$, MFR 0.6 g/10 min (190° C.), melting point 135.2° C, and Mw/Mn 4.5.

Example 14

200 g of sea sand which had been washed with an acid and then heat-treated at 300° C. was fed into a 2-liter autoclave and dried thoroughly. Tetrabenzylzirconium (0.29 g), diethylethoxyaluminum (0.04 g) and indene (0.41 ml) were dissolved in 40 ml of toluene. Into 0.5 ml of the resulting solution was added a solution of methylaluminoxane in toluene [Al/Zr=100 (molar ratio)] and stirring was performed at room temperature for 30 minutes. Further added was 2,2,2-trifluoroethoxyethylene oxide (2.2×10$^{-5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 30 kg/g.Zr, density was 0.9244 g/cm$^3$, MFR 0.6 g/10 min (190° C.), melting point 114.2° C., and Mw/Mn 7.5.

Example 15

200 g of sea sand which had been washed with an acid and then heat-treated at 300° C. was fed into a 2-liter autoclave and dried thoroughly. Tetrachlorozirconium (0.19 g), ethylmagnesium chloride (8.2×10$^{-5}$ mol) and indene (0.41 ml) were dissolved in 40 ml of toluene. Into 0.5 ml of the resulting solution was added a solution of methylaluminoxane in toluene [Al/Zr=100 (molar ratio)] and stirring was performed at room temperature for 30 minutes. Further added was 2-trifluoromethylfuran (2.2×10$^{-5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 30 kg/g.Zr, density was 0.9244 g/cm$^3$ MFR 0 6 g/10 min (190° C.) melting point 114.2° C., and Mw/Mn 4.5.

Example 16

200 g of sea sand which had been washed with an acid and then heat-treated at 300° C. was fed into a 2-liter autoclave and dried thoroughly. Tetrabutoxyzirconium (0.11 g), trihexylaluminum (0.69 ml) and indene (0.23 ml) were dissolved in 13 ml of toluene. Into 0.5 ml of the resulting solution was added a solution of methylaluminoxane in toluene [Al/Zr=100 (molar ratio)] and stirring was performed at room temperature for 30 minutes. Further added was 2-(2',2',2'-trifluoroethyl)-tetrahydrofuran (2.2×10$^{-5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 100 kg/g.Zr, density was 0.9218 g/cm$^3$ MFR 3 5 g/10 min (190° C.) melting point 112.8° C., and Mw/Mn 6.5.

Example 17

200 g of sea sand which had been washed with an acid and then heat-treated at 300° C. was fed into a 2-liter autoclave and dried thoroughly. Tetrabutoxyzirconium (0.11 g), trihexylaluminum (0.69 ml) and indene (0.23 ml) were dissolved in 13 ml of toluene. Into 0.5 ml of the resulting solution was added a solution of methylaluminoxane in toluene [Al/Zr=100 (molar ratio)] and stirring was performed at room temperature for 30 minutes. Further added was 2-(2',2',2'-trifluoroethyl)-tetrahydropyran (2.2×10$^{31\ 5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 90 kg/g.Zr, density was 0.9218 g/cm$^3$ MFR 3 5 g/10 min (190° C.), melting point 112.0° C., and Mw/Mn 6.8.

Example 18

200 g of sea sand which had been washed with an acid and then heat-treated at 300° C. was fed into a 2-liter autoclave and dried thoroughly. Tetrabutoxyzirconium (0.11 g), trihexylaluminum (0.69 ml) and indene (0.23 ml) were dissolved in 13 ml of toluene. Into 0.5 ml of the resulting solution was added a solution of methylaluminoxane in toluene [Al/Zr=100 (molar ratio)] and stirring was performed at room temperature for 30 minutes. Further added was 2-(2',2',2'-trifluoroethoxy)-tetrahydropyran (2.2×10$^{-5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (buterie/ethylene=0.2) continuously to maintain the total pressure at 9 atm. Catalytic efficiency was 85 kg/g.Zr, density was 0.9118 g/cm$^3$ MFR 3.0 g/10 min (190° C.), melting point 111.0° C., and Mw/Mn 8.8.

Example 19

200 g of sea sand which had been washed with an acid and then heat-treated at 300° C. was fed into a 2-liter autoclave and dried thoroughly. Tetrabutoxyzirconium (0.11 g), trihexylaluminum (0.69 ml) and indene (0.23 ml) were dissolved in 13 ml of toluene. Into 0.5 ml of the resulting solution was added a solution of methylaluminoxane in toluene [Al/Zr=100 (molar ratio)] and stirring was performed at room temperature for 30 minutes. Further added was 2-(2',2',2'-trifluoroethoxy)-tetrahydrofuran (2.2×10$^{-5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 88 kg/g.Zr, density was 0.9218 g/cm$^3$, MFR 1.5 g/10 min (190° C.), melting point 116.0° C., and Mw/Mn 7.8.

Example 20

200 g of sea sand which had been washed with an acid and then heat-treated at 300° C. was fed into a 2-liter autoclave and dried thoroughly. Dibenzyldichlorozirconium (0.29 g), ethylmagnesium chloride (8.2×10$^{-5}$ mol) and indene (0.41 ml) were dissolved in 40 ml of toluene. Into 0.5 ml of the resulting solution was added a solution of methylaluminoxane in toluene [Al/Ar=100 (molar ratio)] and stirring was performed at room temperature for 30 minutes. Further added was hexafluorobenzene (2.2×10$^{-5}$ mol), followed by stirring at room temperature for 30 minutes. The resulting solution was charged into the 2-liter autoclave and polymerization was conducted at 60° C. for 2 hours while introducing ethylene gas continuously to maintain the total pressure at 9 atm. Catalytic efficiency was 20 kg/g.Zr, density was 0.9200 g/cm$^3$, MFR 1.6 g/10 min (190° C.), melting point 117.2° C., and Mw/Mn 6.5.

Example 21

200 g of sea sand which had been washed with an acid and then heat-treated at 300° C. was fed into a 2-liter autoclave and dried thoroughly. Tetrabutoxyzirconium (0.11 g), trihexylaluminum (0.69 ml), 1,2-bisindenylethane (0.1 g) and perfluorodecalin (3.0×10$^{-4}$ mol) were dissolved in 13 ml of toluene to prepare a catalyst component solution. Then, a solution of methylaluminoxane in toluene [Al/Zr=100 (molar ratio)] was added into 0.5 ml of the catalyst component solution and stirring was performed at room temperature for 30 minutes to afford a solution of a desired catalyst. This catalyst solution was charged into the 2-liter autoclave and polymerization was conducted at 60° C. for 2 hours while introducing a gaseous mixture of ethylene and 1-butene (butend/ethylene=0.2) continuously to maintain the total pressure at 9 atm. Catalytic efficiency was 200 kg/g.Zr, density was 0.9148 g/cm$^3$, MFR 1.5 g/10 min (190° C.), melting point 111.3° C., and Mw/Mn 7.5.

Example 22

200 g of sea sand which had been washed with an acid and then heat-treated at 300° C. was fed into a 2-liter autoclave and dried thoroughly. Tetrabutoxyzirconium (0.22 g), triethylaluminum (0.19 ml) indene (0.23 ml) and m-bistrifluoromethylbenzene (5.0×10$^{-4}$ mol) were dissolved in 13 ml of toluene to prepare a catalyst component solution. Into 0.5 ml of this catalyst component solution was added a solution of methylaluminoxane in toluene [Al/Zr=100 (molar ratio)] and stirring was performed at room temperature for 30 minutes to afford a solution of a desired catalyst. This catalyst solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 160 kg/g.Zr, density was 0.9240 g/cm$^3$, MFR 0.5 g/10 min (190° C.), melting point 114.2° C., and Mw/Mn 9.3.

Example 23

200 g of sea sand which had been washed with an acid and then heat-treated at 300° C. was fed into a 2-liter autoclave and dried thoroughly. Tetrabutoxyzirconium (0.11 g), trihexylaluminum (0.69 ml) and indene (0.23 ml) were dissolved in 13 ml of toluene. Into 0.5 ml of the resulting solution was added a solution of methylaluminoxane in toluene [Al/Zr=100 (molar ratio)] and stirring was performed at room temperature for 30 minutes. Further added was perfluorodecalin (2.2×10$^{-5}$ mol), followed by stirring at room temperature for 30 minutes. The resulting solution was charged into the 2-liter autoclave and polymerization was conducted at 60° C. for 2 hours while introducing a gaseous mixture of ethylene and 1-butene (butene/ethylene=0.2) to maintain the total pressure at 9 atm. Catalytic efficiency was 170 kg/g.Zr, density was 0.9218 g/cm$^3$, MFR 2.5 g/10 min (190° C.), melting point 111.3° C., and Mw/Mn 7.5.

Example 24

200 g of sea sand which had been washed with an acid and then heat-treated at 300° C. was fed into a 2-liter autoclave and dried thoroughly. Tetrapropoxyzirconium (0.29 g), diethylethoxyaluminum (0.67 ml) and 1,3-dimethylcyclopentadiene (0.41 ml) were dissolved in 40 ml of toluene. Into 0.5 ml of the resulting solution was added a solution of methylaluminoxane in toluene [Al/Zr=100 (molar ratio)] and stirring was performed at room temperature for 30 minutes. Further, m-bistrifluoromethyl-benzene benzene (2.2×10$^{-5}$ mol) was added and stirring was performed at room temperature for 30 minutes. The resultig solution was charged into the 2-liter autoclave and polymerization was conducted at 60° C for 2 hours while introducing a gaseous mixture of ethylene and 1-butene (butene/ethylene=0.2) to maintain the total pressure at 9 atm. Catalytic efficiency was 170 kg/g. Zr, density was 0.9180 g/cm$^3$ MFR 0.6 g/10 min (190° C.), melting point 114.2° C., and Mw/Mn 6.5.

Comparative Example 1

Polymerization was carried out in the same way as in Example 3, provided that 3-perfluorohexyl-1,2-epoxypropane was not used. Catalytic efficiency was 10 kg/g.Zr, density was 0.9208 g/cm$^3$, MFR 0.3 g/10 min (190° C.), melting point 112.3° C., and Mw/Mn 4.3.

Comparative Example 2

Polymerization was carried out in the same way as in Example 6, provided that 2,2-bis-(2',2',2'-trifluoroethoxypropane was not used. Catalytic efficiency was 62 kg/g. Zr, density was 0.9208 g/cm$^3$, MFR 0.7 g/10 min (190° C.), melting point 113.7° C., and Mw/Mn 4.3.

Comparative Example 3

Polymerization was carried out in the same way as in Example 7, provided that chloropentafluorobenzene was not used. Catalytic efficiency was 20 kg/g. Hf, density was 0.9211 g/cm$^3$ MFR 0.4 g/10 min (190° C.) melting point 114.5° C., and Mw/Mn 6.3.

Comparative Example 4

Polymerization was carried out in the same way as in Example 8, provided that trifluoroethyl trityl ether was not used. Catalytic efficiency was 100 kg/g. Zr, Mw 13,000, and Mw/Mn 2.5.

Comparative Example 5

Polymerization was carried out in the same way as in Example 9, provided that 2,2,2-trifluoroethyl trityl ether was not used. Catalytic efficiency was 74 kg/g.Zr, density was 0.9100 g/cm$^3$, MFR 1.8 g/10 min (190° C.), melting point 111.0° C., and Mw/Mn 5.5.

Comparative Example 6

Polymerization was carried out in the same way as in Example 11, provided that 1,1,1-triethoxy-2,2,2-trifluoroethane was not used. Catalytic efficiency was 12 kg/g.Ti, density was 0.9245 g/cm$^3$ MFR 0.02 g/10 min (190° C.), melting point 118.5° C., and Mw/Mn 4.3.

Comparative Example 7

Polymerization was carried out in the same way as in Example 13, provided that 1,1,1-tri(2,2,2-trifluoroethoxy) ethane was not used. Catalytic efficiency was 15 kg/g.Zr, density was 0.9625 g/cm$^3$ MFR 16 g/10 min (190° C.), melting point 134.2° C., and Mw/Mn 4.0.

Comparative Example 8

Polymerization was carried out in the same way as in Example 14, provided that 2,2,2-trifluoroethoxyethylene oxide was not used. Catalytic efficiency was 10 kg/g.Zr, density was 0.9274 g/cm$^3$, MFR 0.5 g/10 min (190° C.), melting point 115.7° C., and Mw/Mn 6.2.

Comparative Example 9

Polymerization was carried out in the same way as in Example 15, provided that 2-trifluoromethylfuran was not used. Catalytic efficiency was 10 kg/g.Zr, density was 0.9233 g/cm$^3$ MFR 0 5 g/10 min (190° C.) melting point 114.7° C., and Mw/Mn 3.2.

Comparative Example 10

Polymerization was carried out in the same way as in Example 20, provided that hexafluorobenzene was not used. Catalytic efficiency was 10 kg/g.Zr, density was 0.9255 g/cm$^3$, MFR 0.7 g/10 min (190° C.), melting point 117.7° C., and Mw/Mn 4.2.

Comparative Example 11

Polymerization was carried out in the same way as in Example 1, provided that trihexylaluminum was not used. Polymer was not obtained.

Comparative Example 12

Polymerization was carried out in the same way as in Example 1, provided that bisindenylethane was not used. Catalytic efficiency was 0.001 kg/g.Zr. From a very broad TREF peak it turned out that the composition distribution was wide.

Example 25

200 g of sea sand which had been washed with an acid and then heat-treated at 300° C. was fed into a 2-liter autoclave and dried thoroughly. Tetrabutoxyzirconium (0.11 g), diisobutylaluminum hydride (0.69 ml), 1,2-bisindenylethane (0.1 g) and 2,2,2-trifluoroethyl triphenylsilyl ether (5.0×10$^{-4}$ mol) were dissolved in 13 ml of toluene to prepare a catalyst component solution. Then, a solution of methylaluminoxane in toluene [Al/Zr=100 (molar ratio)] was added into 0.5 ml of the catalyst component solution and stirring was performed at room temperature for 30 minutes to give a solution of a desired catalyst. This catalyst solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 220 kg/g. Zr, density was 0.9100 g/cm$^3$, MFR 2.0 g/10 min (190° C.), melting point 113.5° C., and Mw/Mn 8.6. From a sharp TREF peak it turned out that the composition distribution was very narrow.

Example 26

200 g of sea sand which had been washed with an acid and then heat-treated at 300° C. was fed into a 2-liter autoclave and dried thoroughly. Tetrabutoxyzirconium (0.22 g), aluminum hydride (0.09 g), indene (0.23 ml) and hexafluorobenzene (4.4×10$^{-5}$ mol) were suspended in 13 ml of toluene to prepare a catalyst component solution. Then, a solution of methylaluminoxane in toluene [Al/Zr=100 (molar ratio)] was added into 0.5 ml of the catalyst component suspension and stirring was performed at room temperature for 30 minutes to afford a solution of a desired catalyst. This catalyst solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 130 kg/g. Zr, density was 0.9200 g/cm$^3$, MFR 1.4 g/10 min (190° C.), melting point 118.0° C., and Mw/Mn 9.1.

Example 27

200 g of sea sand which had been washed with an acid and then heat-treated at 300° C. was fed into a 2-liter autoclave and dried thoroughly. Tributoxymonochlorozirconium (0.26 g), lithium aluminum hydride (0.10 g), indene (0.28 ml) and perfluoromethylcyclohexane (4.4×10$^{-5}$ mol) were suspended in 17 ml of toluene to prepare a catalyst component suspension. Then, a solution of methylaluminoxane in toluene [Al/Zr=100 (molar ratio)] was added into 0.5 ml of the catalyst component suspension and stirring was performed at room temperature for 30 minutes to afford a solution of a desired catalyst. This catalyst solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 23 kg/g. Zr, density was 0.9250 g/cm$^3$ MFR 1.0 g/10 min (190° C.), melting point 117.7° C., and Mw/Mn 9.7.

Example 28

200 g of sea sand which had been washed with an acid and then heat-treated at 300° C. was fed into a 2-liter autoclave and dried thoroughly. Dibutoxydichlorozirconium (0.26 g), lithium aluminum triethoxyhydride (0.80 g), indene (0.28 ml) and 2,2,2-trifluoroethyl trityl ether (4.4×10$^{-5}$ mol) were suspended in 17 ml of toluene to prepare a catalyst component solution. Then, a solution of methylaluminoxane in toluene μAl/Zr=100 (molar ratio)] was added into 0.5 ml of the catalyst component solution and stirring was performed at room temperature for 30 minutes to afford a solution of a desired catalyst. This catalyst solution was charged into the 2-liter autoclave and polymerization was conducted at 60° C. for 2 hours while introducing a gaseous mixture of ethylene and 1-butene (butene/ethylene=0.2) continuously to maintain the total pressure at 9 atm. Catalytic efficiency was 38 kg/g.Zr, density was 0.9180 g/cm$^3$, MFR 0.4 g/10 min (190° C.), melting point 115.2° C., and Mw/Mn 6.7.

Example 29

200 g of sea sand which had been washed with an acid and then heat-treated at 300° C. was fed into a 2-liter autoclave and dried thoroughly. Tetrabutoxytitanium (0.13 g), lithium aluminum tri-tert-butoxyhydride (0.60 g), indene (0.35 ml) and 2,2-dimethoxy-1,1,1,3,3,3-hexafluoropropane (4.2×10$^{-5}$ mol) were dissolved in 17 ml of toluene to prepare a catalyst component solution. Then, a solution of methylaluminoane in toluene [Al/Ti=1,000 (molar ratio)] was added into 0.5 ml of the catalyst component solution and stirring was performed at room temperature for 30 minutes to afford a solution of a desired catalyst. This catalyst solution was charged into the 2-liter autoclave and polymerization was allowed to proceed at 60° C. for 2 hours while introducing a gaseous mixture of ethylene and 1-butene (butene/ethylene=0.2) continuously to maintain the total pressure at 9 atm. Catalytic efficiency was 45 kg/g.Ti, density was 0.9100 g/cm$^3$, MFR 1.3 g/10 min (190° C.), melting point 111.2° C., and Mw/Mn 8.5.

Example 30

200 g of sea sand which had been washed with an acid and then heat-treated at 300° C. was fed into a 2-liter autoclave and dried thoroughly. Tetrapropoxyhafnium (0.23 g), diisobutylaluminum hydride (0.38 ml), indene (0.23 ml) and 1,1,1-tris-(2,2.2-trifluoroethoxy)-ethane (1.3×10$^{-5}$ mol) were dissolved in 25 ml of toluene to prepare a catalyst component solution. Then, a solution of methylaluminoxane in toluene [Al/Hf=500 (molar ratio)] was added into the catalyst component solution and stirring was made at room temperature for 30 minutes to afford a solution of a desired catalyst. This catalyst solution was charged into the 2-liter autoclave and polymerization was allowed to proceed at 60° C. for 2 hours while introducing a gaseous mixture of ethylene and 1-butene (butene/ethylene=0.2) continuously to maintain the total pressure at 9 atm. Catalytic efficiency was 45 kg/g.Hf, density was 0.9200 g/cm$^3$ MFR 12 g/10 min (190° C.) melting point 115 0° C. and Mw/Mn 7.7.

Example 31

500 ml of purified toluene was fed into a thoroughly dried 2-liter autoclave. Tetrabutoxyzirconium (0.11 g), di-isobutylaluminum hydride (0.69 ml), 1,2,4-trimethylcyclopentadiene (0.31 g) and 1,1,1-trimethoxy-2,2,2-trifluoroethane ($4.4\times10^{-5}$ mol) were dissolved in 13 ml of toluene to prepare a catalyst component solution. Then, a solution of methylaluminoxane in toluene [Al/Zr=600 (molar ratio)] was added into 0.5 ml of the catalyst component solution and stirring was made at room temperature for 30 minutes to prepare a solution of a desired catalyst. This catalyst solution was charged into the 2-liter autoclave and polymerization was allowed to proceed at 60° C. for 2 hours while introducing propylene gas continuously to maintain the total pressure at 9 atm. Catalytic efficiency was 220 kg/g.Zr, Mw 16,000, and Mw/Mn 3.9.

Example 32

200 g of sea sand which had been washed with an acid and then heat-treated at 300° C. was fed into a 2-liter autoclave and dried thoroughly. Tetrapropoxyzirconium (0.29 g), catechol borane (0.12 g), 1,3-dimethylcyclopentadiene (0.08 g) and 2,2-bis-(2,2,2-trifluoroethoxy)-propane ($4.4\times10^{-5}$ mol) were dissolved in 40 ml of toluene. Into 0.5 ml of the resulting solution was added a solution of methylaluminoxane in toluene [Al/Zr=100 (molar ratio)] and stirring was made at room temperature for 30 minutes. The resulting solution was introduced into the 2-liter autoclave and polymerization was allowed to proceed at 60° C. for 2 hours while introducing a gaseous mixture of ethylene and 1-butene (butene/ethylene=0.2) continuously to maintain the total pressure at 9 atm. Catalytic efficiency was 60 kg/g.Zr, density was 0.9200 g/cm$^3$, MFR 0.6 g/10 min (190° C.), melting point 116.5° C., and Mw/Mn 5.5.

Example 33

200 g of sea sand which had been washed with an acid and then heat-treated at 300° C. was fed into a 2-liter autoclave and dried thoroughly. Tetrapropoxyzirconium (0.29 g), sodium borohydride (0.05 g), 1,3-dimethylcyclopentadiene (0.08 g) and 3-perfluorohexyl-1,2-epoxypropane ($4.3\times10^{-5}$ mol) were suspended in 40 ml of toluene. Into 0.5 ml of the resulting suspension was added a solution of methylaluminoxane in toluene [Al/Zr=100 (molar ratio] and stirring was made at room temperature for 30 minutes. The resulting solution was charged into the 2-liter autoclave and polymerization was allowed to proceed at 60° C. for 2 hours while introducing ethylene gas continuously. Catalytic efficiency was 30 kg/g.Zr, density was 0.9650 g/cm$^3$, MFR 0.6 g/10 min (190° C.) melting point 137 0° C., and Mw/Mn 5.2.

Example 34

200 g of sea sand which had been washed with an acid and then heat-treated at 300° C. was fed into a 2-liter autoclave and dried thoroughly. Tetrabenzylzirconium (0.29 g), zinc borohydride (0.04 g), indene (0.41 ml) and 3-(2,2,3,3-tetrafluoropropoxy)-1,2-epoxypropane ($4.4\times10^{-5}$ mol) were suspended in 40 ml of toluene. Into 0.5 ml of the resulting suspention was added a solution of methylaluminoxane in toluene [Al/Zr=100 (molar ratio)] and stirring was made at room temperature for 30 minutes. The resulting solution was charged into the 2-liter autoclave and polymerization was allowed to proceed at 60° C. for 2 hours while introducing a gaseous mixture of ethylene and 1-butene (butene/ethylene=0.2) continuously to maintain the total pressure at 9 atm. Catalytic efficiency was 22 kg/g.Zr, density was 0.9180 g/cm$^3$ MFR 0.9 g/10 min (190° C.), melting point 117.2° C., and Mw/Mn 7.6.

Example 35

200 g of sea sand which had been washed with an acid and then heat-treated at 300° C. was fed into a 2-liter autoclave and dried thoroughly. Tetrabutoxyzirconium (0.11 g), diisobutylaluminum hydride (0.69 ml) 1,2-bisindenylethane (0.1 g) and 2-trifluoromethyltetrahydrofuran ($4.4\times10^{-5}$ mol) were dissolved in toluene to prepare a catalyst component solution. Then, a solution of methylaluminoxane in toluene [Al/Zr=100 (molar ratio)] was added into 0.5 ml of the catalyst component solution and stirring was made at room temperature for 30 minutes to afford a solution of a desired catalyst. This catalyst solution was charged into the 2-liter autoclave and polymerization was allowed to proceed at 60° C. for 2 hours while introducing a gaseous mixture of ethylene and 1-butene (butene/ethylene=0.2) continuously to maintain the total pressure at 9 arm. Catalytic efficiency was 200 kg/g.Zr, density was 0.9200 g/cm$^3$, MFR 1.1 g/10 min (190° C.), melting point 115.0° C., and Mw/Mn 7.9. From a sharp TREF peak it turned out that the composition distribution was very narrow.

Example 36

200 g of sea sand which had been washed with an acid and then heat-treated at 300° C. was fed into a 2-liter autoclave and dried thoroughly. Tetrabutoxyzirconium (0.22 g), aluminum hydride (0.09 ml) indene (0.23 ml) and 2-trifluoromethyltetrahydropyran ($4.4\times10^{-5}$ mol) were dissolved in 13 ml toluene to prepare a catalyst component solution. Then, a solution of methylaluminoxane in toluene [Al/Zr=100 (molar ratio)] was added into 0.5 ml of the catalyst component solution and stirring was made at room temperature for 30 minutes to give a solution of a desired catalyst. This catalyst solution was charged into the 2-liter autoclave and polymerization was allowed to proceed at 60° C. for 2 hours while introducing a gaseous mixture of ethylene and 1-butene (butene/ethylene=0.2) continuously to maintain the total pressure at 9 atm. Catalytic efficiency was 100 kg/g. Zr, density was 0.9250 g/cm$^3$, MFR 1.3 g/10 min (190° C.), melting point 116.3° C., and Mw/Mn 9.1.

Example 37

200 g of sea sand which had been washed with an acid and then heat-treated at 300° C. was fed into a 2-liter autoclave and dried thoroughly. Tributoxymonochlorozirconium (0.26 g), lithium aluminum hydride (0.10 g) indene (0.28 ml) and 2-(2',2',2'-trifluoroethoxy)-tetrahydrofuran ($2.2\times10^{-5}$ mol) were suspended in 17 ml of toluene to prepare a catalyst component suspension. Then, a solution of methylaluminoxane in toluene [Al/Zr=100 (molar ratio)] was added into 0.5 ml of the catalyst component suspension and stirring was made at room temperature for 30 minutes to give a solution of a desired catalyst. This catalyst solution was charged into the 2-liter autoclave and polymerization was allowed to proceed at 60° C. for 2 hours while introducing a gaseous mixture of ethylene and 1-butene (butene/ethylene =0.2) continuously to maintain the total pressure at 9 atm. Catalytic efficiency was 19 kg/g. Zr, density was 0.9190 g/cm$^3$, MFR 0.4 g/10 min (190° C.), melting point 116.3° C., and Mw/Mn 9.8.

Example 39

200 g of sea sand which had been washed with an acid and then heat-treated at 300° C. was fed into a 2-liter autoclave and dried thoroughly. Dibutoxydichlorozirconium (0.26 g), lithium aluminum triethoxyhydride (0.80 g) indene (0.28 ml) and 2-(2',2',2'-trifluoroethoxy)-tetrahydropyran (2.2× $10^{-5}$ mol) were dissolved in 17 ml of toluene to prepare a catalyst component solution. Then, a solution of methylaluminoxane in toluene [Al/Zr=100 (molar ratio)] was added into 0.5 ml of the catalyst component solution and stirring was made at room temperature for 30 minutes to give a solution of a desired catalyst. This catalyst solution was charged into the 2-liter autoclave and polymerization was allowed to proceed at 60° C. for 2 hours while introducing a gaseous mixture of ethylene and 1-butene (butene/ethylene =0.2) continuously to maintain the total pressure at 9 atm. Catalytic efficiency was 37 kg/g.Zr, density was 0.9250 g/cm$^3$, MFR 0.2 g/10 min (190° C.), melting point 119.3° C., and Mw/Mn 6.7.

Comparative Example 13

Polymerization was conducted in the same manner as in Example 25, provided that 2,2,2-trifluoroethyl triphenylsilyl ether was not used. Catalytic efficiency was 150 kg/g.Zr, density was 0.9208 g/cm$^3$ MFR 0.3 g/10 min (190° C.), melting point 114.0° C., and Mw/Mn 7.5.

Comparative Example 14

Polymerization was conducted in the same manner as in Example 25, provided that diisobutylaluminum hydride was not used. Polymer was not obtained.

Comparative Example 15

Polymerization was conducted in the same manner as in Example 25, provided that bisindenylethane was not used. Catalytic efficiency was 0.001 kg/g.Zr. From a very broad TREF peak it turned out that the composition distribution was wide.

What is claimed is:

1. A catalyst for the polymerization of olefins, said catalyst comprising a modified organoaluminum compound containing an Al—O—Al bond, and a catalyst component being prepared by contacting at least the following constituents (1), (2), (3) and (4) with one another:

(1) a compound represented by the general formula $Me^1R^1_p(OR^2)_qX_{4-p-q}$ wherein $R^1$ and $R^2$ are each independently a hydrocarbon group having 1 to 24 carbon atoms, X is a halogen atom, $Me^1$ is Zr, Ti or Hf, p and q are each an integer in the ranges of $0 \leq p \leq 4$ provided $0 \leq p \leq 4$, provided $0 \leq p+q \leq 4$;

(2) at least one compound selected from the group consisting of compounds represented by the following general formulas 1 to 4:

General formula 1: $Me^2R^3_m(OR^4)_nX^2_{z-m-n}$

General formula 2: $Me^3H_aR^5_{3-a}$

General formula 3: $Me^4[Me^3H_bR^6_c(OR^7)_{4-b-c}]_y$

General formula 4:

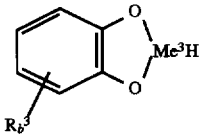

where $R^3$, $R^4$, $R^5$, $R^6$, $R^7$ and $R^8$, which may be the same or different, and are each independently a hydrocarbon group having 1 to 24 carbon atoms, $Me^2$ is a Group 1, 2, 12 or 13 element in the Periodic Table of Elements, $Me^3$ is a Group 13 element in the same Table, $Me^4$ is a Group 1, 2, or 12 element in the same Table, $X^2$ is a halogen atom, z is the valence of $Me^2$, y is the valence of $Me^4$, and m, n, a, b, c and d are each an integer in the ranges of $0 \leq m \leq z$, $0 \leq n \leq z$, provided $0 \leq m+n \leq z$, $0 < a \leq 3$, $1 \leq b \leq 4$, $1 \leq c \leq 3$, provided $1 \leq b+c \leq 4$; and $0 \leq d \leq 4$;

(3) an organocyclic compound having two or more conjugated double bonds; and (4) a compound represented by the general formula $R^2(A-R^3)_q$ where q is a number falling under the range of $1 \leq q \leq 3$, A is a group selected from —O—, —OSiR$^4_2$—, —C(OR$^5$)$_2$— and —C(OR$^5$)$_2$O—, $R^2$ is a fluorocarbon group having 1 to 30 carbon atoms, $R^3$ and $R^4$ are each a hydrogen atom, a halogen atom, or a hydrocarbon residue having 1 to 30 carbon atoms, and $R^5$ is a hydrocarbon residue having 1 to 30 carbon atoms, provided in the case where $R^3$, $R^4$ or $R^5$ is included in a plural number, the plural Rs may be the same or different, and $R^2$ and $R^3$ may conjointly form a ring.

* * * * *